United States Patent
Mori

(10) Patent No.: US 8,411,179 B2
(45) Date of Patent: Apr. 2, 2013

(54) IMAGING DEVICE, METHOD OF CONVERTING READ-OUT SIGNAL, AND CAMERA

(75) Inventor: Tomonori Mori, Kanagawa (JP)

(73) Assignee: Sony Corporation (JP)

( * ) Notice: Subject to any disclaimer, the term of this patent is extended or adjusted under 35 U.S.C. 154(b) by 471 days.

(21) Appl. No.: 12/661,492

(22) Filed: Mar. 18, 2010

(65) Prior Publication Data

US 2010/0245639 A1    Sep. 30, 2010

(30) Foreign Application Priority Data

Mar. 30, 2009   (JP) ................ P2009-083661

(51) Int. Cl.
*H04N 3/14* (2006.01)
*H04N 5/335* (2011.01)

(52) U.S. Cl. ....................................... 348/294

(58) Field of Classification Search ............ 348/294
See application file for complete search history.

(56) References Cited

U.S. PATENT DOCUMENTS

| | | | |
|---|---|---|---|
| 7,079,129 B2 * | 7/2006 | Shigeta ................ | 345/213 |
| 7,804,535 B2 * | 9/2010 | Muramatsu et al. ...... | 348/273 |
| 2002/0135705 A1 * | 9/2002 | Nakatsuji et al. ........ | 348/806 |
| 2005/0253942 A1 * | 11/2005 | Muramatsu et al. ...... | 348/273 |
| 2006/0214086 A1 | 9/2006 | Fukushima | |
| 2009/0109308 A1 | 4/2009 | Fukushima | |
| 2009/0231479 A1 * | 9/2009 | Zarnowski et al. ........ | 348/302 |

FOREIGN PATENT DOCUMENTS

| | | |
|---|---|---|
| JP | 2006-270293 A | 10/2006 |
| JP | 2006-303752 A | 11/2006 |

* cited by examiner

*Primary Examiner* — Chieh M Fan
*Assistant Examiner* — Fayez Bhuiyan
(74) *Attorney, Agent, or Firm* — Lerner, David, Littenberg, Krumholz & Mentlik, LLP

(57) ABSTRACT

An imaging device includes: a pixel unit that converts incident light into an electrical signal corresponding to the amount of the incident light; and a read-out unit that reads out a read-out signal from the pixel unit for a first period and a second period, wherein the read-out unit includes a clock signal generating section that generates clock signals having a frequency corresponding to the voltage of the read-out signal, a first counter section that counts the clock signals generated by the clock signal generating section, a second counter section that counts output clock signals of the first counter section, a first correction section that corrects the voltage of the read-out signal to be constant before start of counting of the first and second counter sections for the first period and stops correction of the voltage of the read-out signal after the start of counting of the first and second counting sections for the first period and during the second period, and a second correction section that corrects a frequency of the output clock signal of the first counter section to a frequency that is higher than the frequency of the output clock signal.

10 Claims, 14 Drawing Sheets

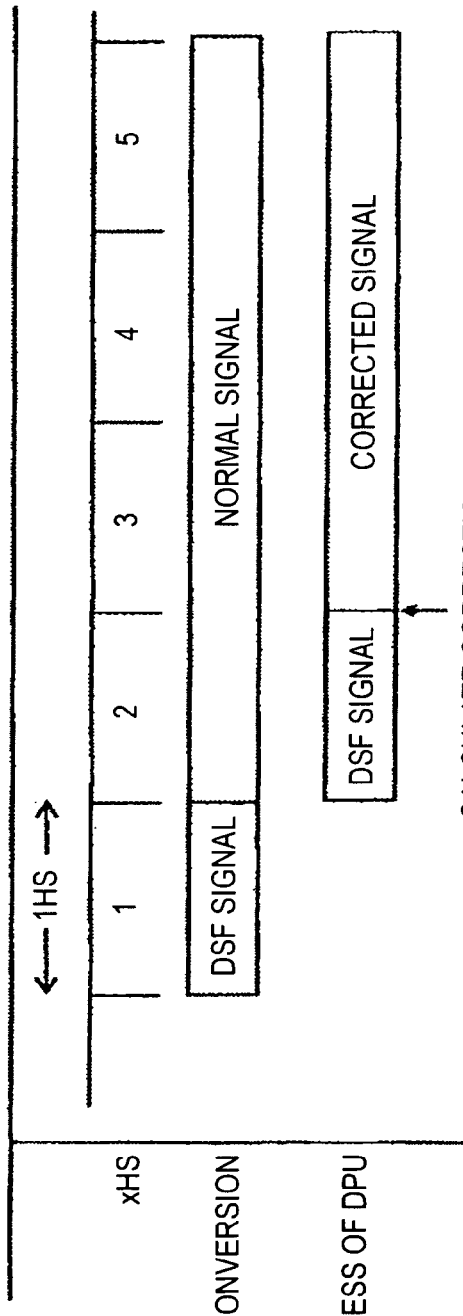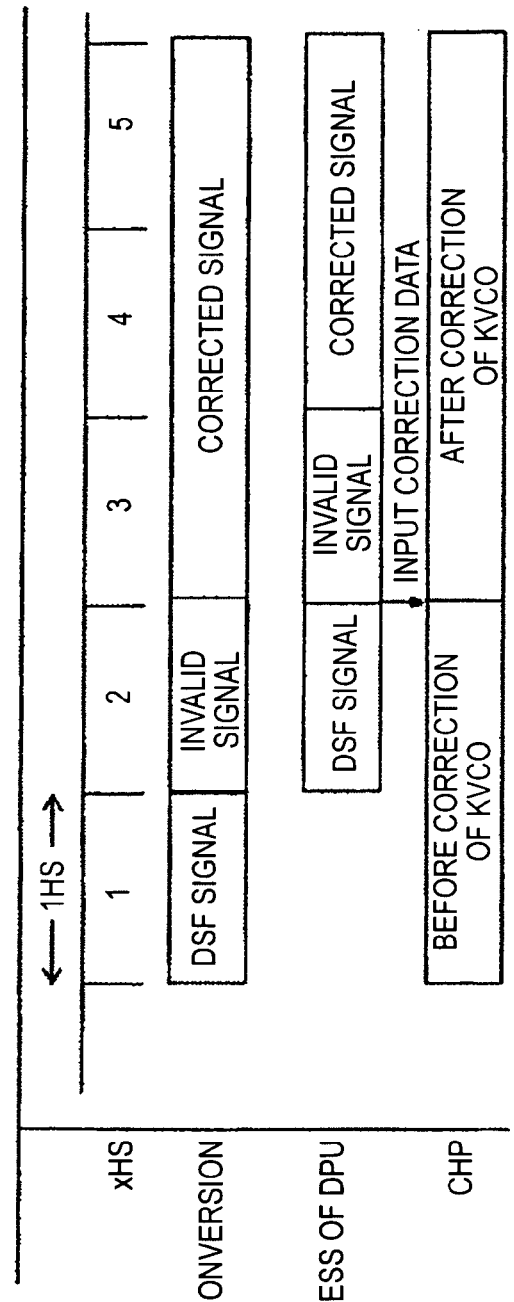

IMAGING DEVICE, METHOD OF CONVERTING READ-OUT SIGNAL, AND CAMERA

CROSS-REFERENCE TO RELATED APPLICATION

The present application claims priority from Japanese Patent Application No. JP 2009-083661 filed in the Japanese Patent Office on Mar. 30, 2009, the entire content of which is incorporated herein by reference.

BACKGROUND OF THE INVENTION

1. Field of the Invention

The present invention relates to an imaging device such as a CMOS (Complementary Metal Oxide Semiconductor) image sensor, a method of converting a read-out signal, and a camera.

2. Description of the Related Art

In CMOS image sensors and the like, an analog signal read out from a pixel circuit is converted (A/D converted) into a digital signal (for example, JP-A-2006-303752). In many cases, the A/D conversion is performed by an ADC circuit disposed inside a column processing circuit.

The ADC circuit performs the A/D conversion by comparing a ramp-waveform reference voltage that is generated by a DAC circuit with the voltage of an analog signal read out from the pixel circuit by using a voltage comparator or the like. The column processing circuit is connected to the DAC circuit though several thousands of wirings. Accordingly, there is a problem in that the layout area of the column processing circuit is increased in accordance with an increase in the number of pixels.

In addition, a large current flows by using the DAC circuit in accordance with an increase in the number of pixels. Thus, the driving capability of the DAC circuit may need to be increased. In such a case, the wirings are complicated, and accordingly, there is a problem in that the load of the DAC circuit or the column processing circuit is increased.

As a method of solving the above-described problems, an ADC circuit that performs the A/D conversion by using a voltage-controlled oscillator (hereinafter, referred to as a "VCO") is disclosed (for example, JP-A-2006-270293).

The ADC circuit using the VCO does not use a voltage comparator. Accordingly, the wiring pattern is simplified, and therefore the above-described problems can be solved.

SUMMARY OF THE INVENTION

However, the VCO has a variation in capability depending on the temperature, the power source voltage, or a manufacturing process. Such a variation causes a variation in the count value counted by a counter when the A/D conversion is performed for a P phase.

Thus, a counting operation may need to be performed after the oscillation frequency of the VCO is stabilized. Accordingly, there is a problem in that a time that may be needed for the A/D conversion is long.

In addition, the ADC circuit using the VCO performs the A/D conversion by counting clock signals having a frequency at which the VCO oscillates. Accordingly, the oscillation frequency may need to be lowered.

Thus, there are problems in that the CR time constant of a delay element configuring the VCO is increased, and the layout area of the column processing circuit is increased.

There is a need for providing an imaging device, a method of converting a read-out signal, and a camera that are capable of performing the A/D conversion at a high speed without depending on the capability of the VCO and decreasing the layout area of the column processing circuit.

According to an embodiment of the present invention, there is provided an imaging device including: a pixel unit that converts incident light into an electrical signal corresponding to the amount of the incident light; and a read-out unit that reads out a read-out signal from the pixel unit for a first period and a second period. The read-out unit includes: a clock signal generating section that generates clock signals having a frequency corresponding to the voltage of the read-out signal; a first counter section that counts the clock signals generated by the clock signal generating section; a second counter section that counts output clock signals of the first counter section; a first correction section that corrects the voltage of the read-out signal to be constant before start of counting of the first and second counter sections for the first period and stops correction of the voltage of the read-out signal after the start of counting of the first and second counting sections for the first period and during the second period; and a second correction section that corrects a frequency of the output clock signal of the first counter section to a frequency that is higher than the frequency of the output clock signal.

According to another embodiment of the present invention, there is provided a method of converting a read-out signal. The method includes the steps of: reading out a read-out signal from a pixel unit for a first period; correcting the voltage of the read-out signal, which is read out in the reading out of a signal, for the first period to be constant; stopping the correcting of the voltage of the read-out signal; generating a clock signal having a frequency corresponding to the voltage of the read-out signal that is corrected in the stopping of the correcting of the voltage; counting the clock signals that are generated in the generating of a clock signal; correcting the frequency of the output clock signal, which is output in the counting of the clock signals, to a frequency that is higher than the frequency of the output clock signal; counting the output clock signals that are corrected in the correcting of the frequency of the output clock signal; reading out a read-out signal from the pixel unit for the second period; generating a clock signal having a frequency corresponding to the voltage of the read-out signal that is read out in the reading out of a signal for the second period; counting the clock signals generated in the generating of the clock signal; correcting the frequency of the output clock signal, which is output in the counting of the clock signals, to a frequency higher than the frequency of the output clock signal; and counting the output clock signal that is corrected in the correcting of the frequency of the output clock signal.

According to another embodiment of the present invention, there is provided a camera including: an imaging device; an optical system that guides light incident to a pixel area of the imaging device; and a signal processing unit that processes an output signal output by the imaging device. The imaging device includes: a pixel unit that converts incident light into an electrical signal corresponding to the amount of the incident light; and a read-out unit that reads out a read-out signal from the pixel unit for a first period and a second period. The read-out unit includes: a clock signal generating section that generates clock signals having a frequency corresponding to the voltage of the read-out signal; a first counter section that counts the clock signals generated by the clock signal generating section; a second counter section that counts output clock signals of the first counter section; a first correction section that corrects the voltage of the read-out signal to be constant before start of counting of the first and second counter sections for the first period and stops correction of the voltage of the read-out signal after the start of counting of the first and second counting sections for the first period and during the second period; and a second correction section that corrects a frequency of the output clock signal of the first counter section to a frequency that is higher than the frequency of the output clock signal.

According to an embodiment of the present invention, the read-out unit reads out a read-out signal from a pixel unit for a first period.

Then, the first correction section corrects the voltage of the read-out signal to be constant and then stops the correcting of the voltage.

The clock signal generating section generates a clock signal having a frequency corresponding to the voltage of the read-out signal that is corrected by the first correction section.

When the clock signal is input from the clock signal generating section, the first counter counts the clock signals.

Then, the second correction section corrects the frequency of the output clock signal of the first counter to a frequency that is higher than the frequency of the output clock signal.

The second counter counts the output clock signals that are corrected by the second correction section.

The read-out unit reads out a read-out signal from the pixel unit for the second period.

Then, the clock signal generating section generates a clock signal having a frequency corresponding to the voltage of the read-out signal.

When the clock signal is input from the clock signal generating section, the first counter counts the clock signals.

Then, the second correction section corrects the frequency of the output clock signal of the first counter to a frequency higher than the frequency of the output clock signal.

The second counter counts the output clock signals that are corrected by the second correction section.

According to an embodiment of the present invention, the A/D conversion can be performed at a high speed without depending on the capability of the VCO, and the layout area of the column processing circuit can be decreased.

BRIEF DESCRIPTION OF THE DRAWINGS

FIGS. 14A to 14C are timing charts representing an example of the operation of a column processing circuit according to the third embodiment of the present invention.

FIGS. 15A to 15D are timing charts illustrating an example of the operation of a column processing circuit according to the third embodiment of the present invention.

DESCRIPTION OF THE PREFERRED EMBODIMENTS

Hereinafter, embodiments of the present invention will be described with reference to the accompanying drawings. In addition, the description will be made in the following order.

1. First Embodiment (a case where a first correction section and a second correction section are included)
2. Second Embodiment (a case where only the first correction section is included)
3. Third Embodiment (a modified example of the first correction section)
4. Fourth Embodiment (camera)

1. First Embodiment

Configuration Example of CMOS Image Sensor 1

Figure 1:
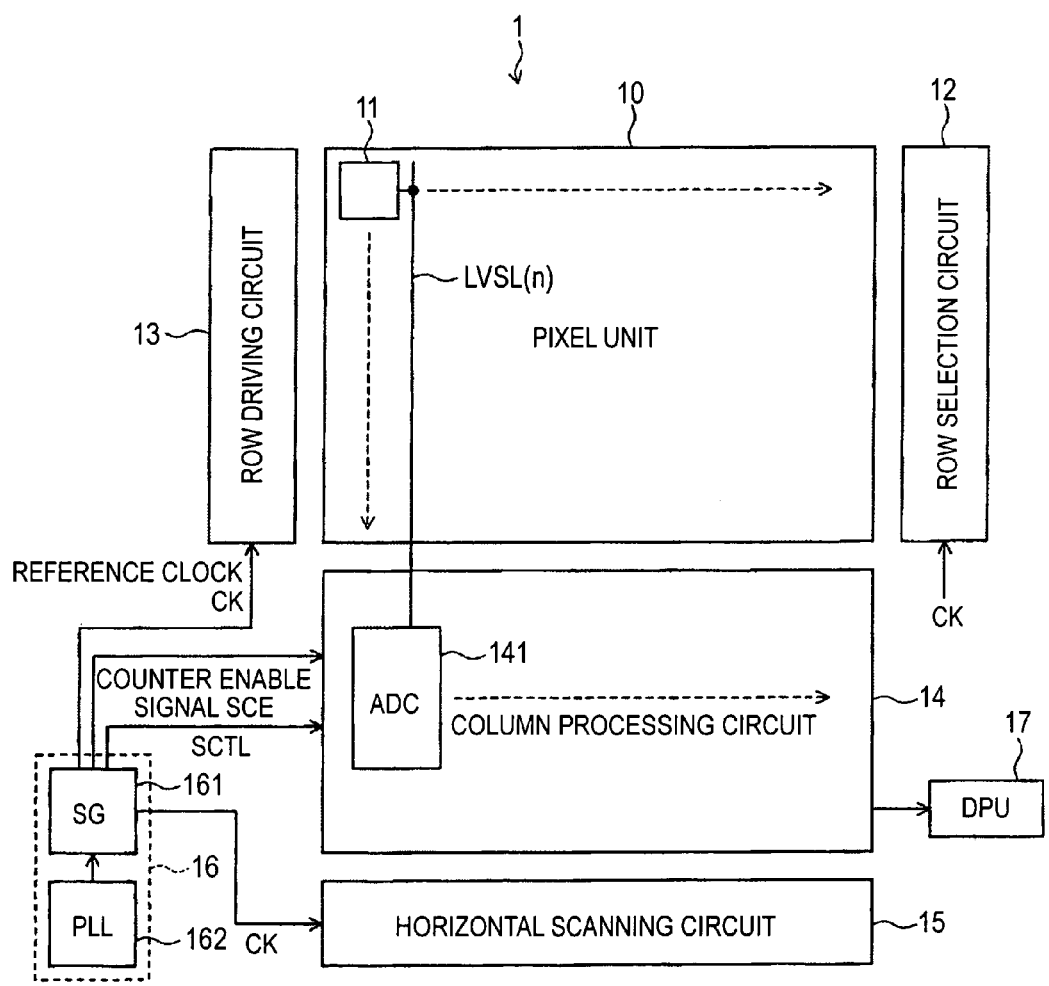
FIG. 1 is a schematic block diagram representing a configuration example of a CMOS image sensor according to a first embodiment of the present invention.

FIG. 1 is a schematic block diagram representing a configuration example of a CMOS image sensor according to a first embodiment of the present invention.

FIG. 1 represents a major portion of the CMOS image sensor 1.

The CMOS image sensor 1 as an imaging device represented in FIG. 1 has a pixel unit 10, a plurality of pixel circuits 11, a row selection circuit 12, a row driving circuit 13, a column processing circuit 14, a horizontal scanning circuit 15, a control circuit 16, and a digital signal processing circuit (hereinafter, referred to as a "DPU") 17.

The pixel unit 10 is a pixel area that receives incident light. In the pixel unit 10, m (row direction)×n (column direction) pixel circuits 11 are arranged in a matrix shape.

Each pixel circuit 11, as an example, is arranged in a Bayer pattern. Each pixel circuit 11 is covered with one color filter of Gr (green), R (red), B (blue) and Gb (green) and detects a color corresponding to the color filter of each color.

At this time, the pixel circuit 11 converts incident light into electric charges (electrons) by performing photoelectric conversion and outputs the electric charges to a node ND1 on a vertical signal line LVSL(n) as a voltage signal (a read-out signal according to an embodiment of the present invention).

The row selection circuit 12 selects the m-th pixel circuit 11 based on a row selection signal that is input from the control circuit 16.

The row driving circuit 13 drives the m-th pixel circuit 11 based on the row selection signal input from the row driving circuit 13 and a reference clock CK input from the control circuit 16.

The column processing circuit (a read-out unit according to an embodiment of the present invention) 14 has an ADC circuit 141 for each vertical row (column). The number of the ADC circuits 141 is the same as the number (n) of the pixel circuits 11 arranged in the column direction.

The ADC circuit 141 reads out a voltage signal from the pixel circuit 11 for each column based on the control of the horizontal scanning circuit 15. The read-out voltage signal is an analog signal, and accordingly, the ADC circuit 141 performs a correlated double sampling (hereinafter, referred to as "CDS") process for the voltage signal. Accordingly, the analog signal is converted into a digital signal (A/D conversion).

The horizontal scanning circuit 15, for example, is configured by a shift register or the like. The horizontal scanning circuit 15 sequentially selects the ADC circuits 141 of the column processing circuit 14 for each column based on the reference clock CK input from the control circuit 16.

The control circuit 16 (a direction unit according to an embodiment of the present invention) has a control signal generating circuit (hereinafter referred to as an "SG") 161 and a PLL (Phase Locked Loop) circuit 162 for the SG 161.

The SG 161 generates various control signals based on the phase control of the PLL circuit 162. The control signals include a control signal SCTL (a direction signal according to an embodiment of the present invention), to be described later, a count enable signal SCE (a count start signal according to an embodiment of the present invention; hereinafter referred to as a "CE signal SCE"), the reference clock CK, and the like.

The control circuit 16 outputs the reference clock signal CK to the row selection circuit 12, the row driving circuit 13, and the horizontal scanning circuit 15. The control circuit 16 outputs the control signal SCTL, the CE signal SCE, or the like to the column processing circuit 14.

The DPU 17 (a calculation unit according to an embodiment of the present invention) acquires a digital value of the original image data read out from the pixel unit 10 by calculating a difference between a count value for a P phase and a count value for a D phase.

[Example of Circuit Configuration of Pixel Circuit 11]

An example of the circuit configuration of the pixel circuit 11 will be described with reference to FIG. 2.

Figure 2:
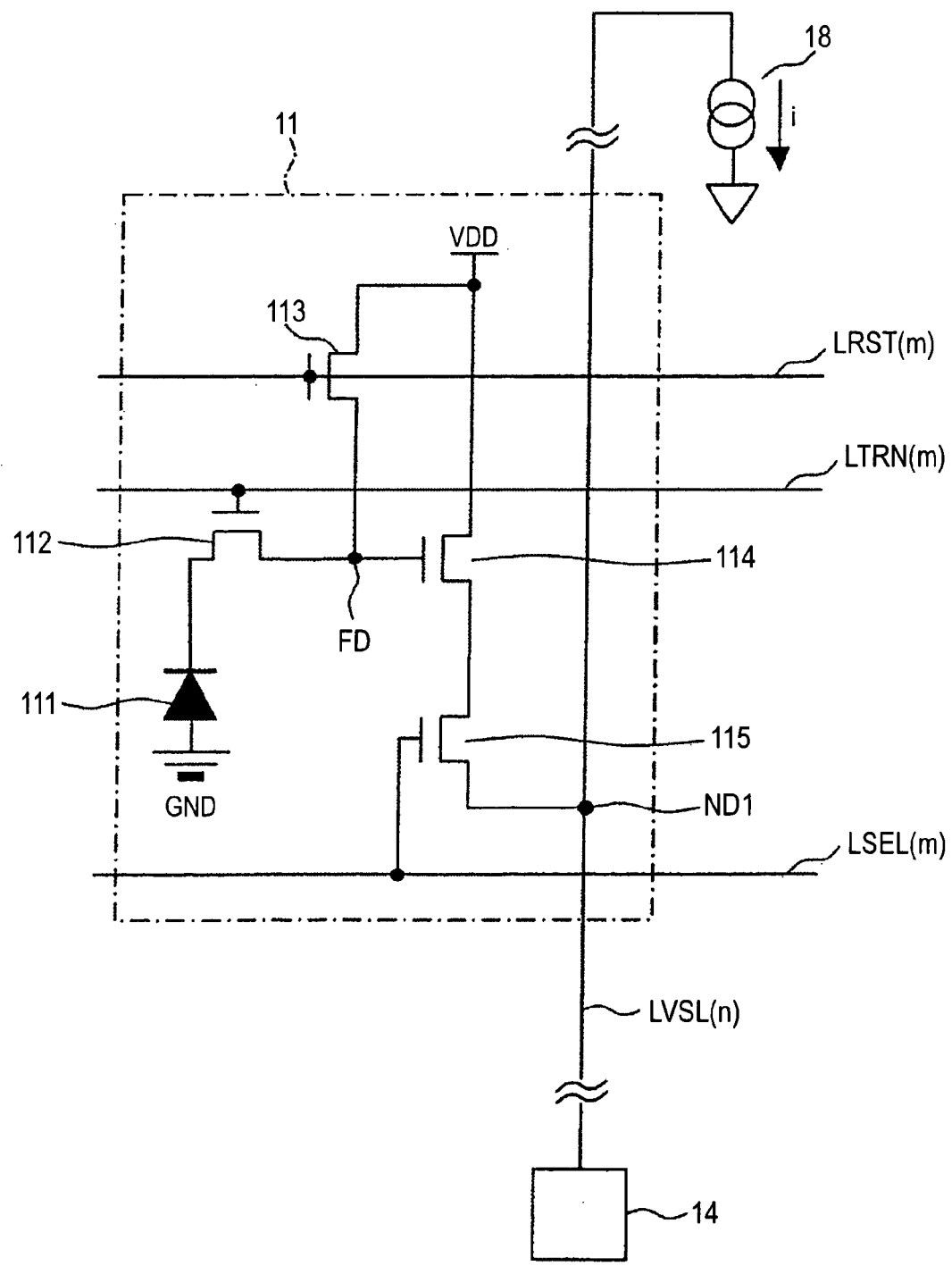
FIG. 2 is an equivalent circuit diagram representing a configuration example of a pixel circuit according to the first embodiment of the present invention.

FIG. 2 is an equivalent circuit diagram representing a configuration example of a pixel circuit according to the first embodiment of the present invention.

FIG. 2 represents the m-th pixel circuit located in the n-th row.

The pixel circuit 11 represented in FIG. 2 has a photoelectric conversion device 111, for example, configured by a photo diode, a transmission transistor 112, a reset transistor 113, an amplifier transistor 114, and a selection transistor 115.

The photoelectric conversion device 111 has an anode side grounded (GND) and a cathode side connected to the source of the transmission transistor 112. The photoelectric conversion device 111 performs photoelectric conversion for converting the incident light into electric charges (electrons) in accordance with the amount of the incident light and accumulates the electric charges.

As each transistor represented in FIG. 2, an re-channel field effect transistor of the insulation gate-type is used as an example.

In order to transmit the electric charges accumulated in the photoelectric conversion device 111 to a floating diffusion FD (hereinafter, referred to as an "FD"), the transmission transistor 112 is connected between the cathode side of the photoelectric conversion device 111 and the FD. To the gate of the transmission transistor 112, a transmission signal line LTRN (m) is connected. One end of the transmission signal line LTRN(m) is connected to the row driving circuit 13.

To the FD, the drain of the transmission transistor 112, the source of the reset transistor 113, and the gate of the amplifier transistor 114 are connected.

The reset transistor 113 is connected between the FD and a power source voltage VDD for resetting the electric potential of the FD to the power source voltage VDD. To the gate of the reset transistor 113, a reset signal line LRST(m) is connected. One end of the reset signal line LRST(m) is connected to the row driving circuit 13.

The amplifier transistor 114 has the drain connected to the power source voltage VDD and the source connected to the drain of the selection transistor 115. The amplifier transistor 114 amplifies the electric potential of the FD.

The selection transistor 115 has the drain connected to the source of the amplifier transistor 114, the source connected to the vertical signal line LVSL(n), and the gate connected to the selection signal line LSEL(m) so as to be in series with the amplifier transistor 114. One end of the selection signal line LSEL(m) is connected to the row driving circuit 13.

To the vertical signal line LVSL(n), a current source 18 is connected. Thus, a source follower circuit is formed by the amplifier transistor 114 and the current source 18. To one end of the vertical signal line LVSL(n), the column processing circuit 14 is connected.

[Overview of Column Processing Circuit 14]

The overview of the column processing circuit 14 will now be described with reference to FIG. 3.

Figure 3:
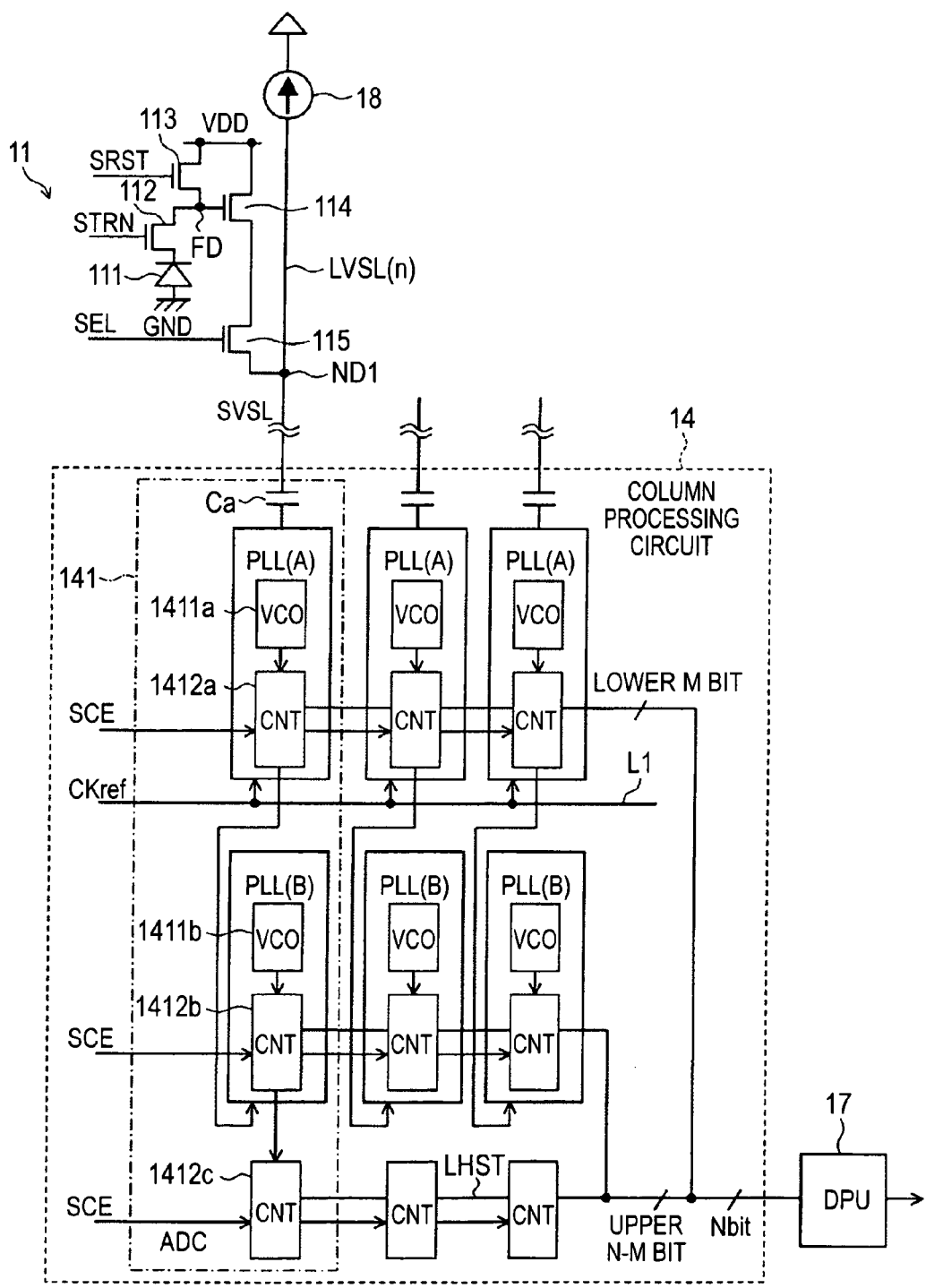
FIG. 3 is a schematic block diagram representing a configuration example of a column processing circuit according to the first embodiment of the present invention.

FIG. 3 is a schematic block diagram representing a configuration example of a column processing circuit according to the first embodiment of the present invention.

For clear description, in FIG. 3, only the column processing circuit and a major portion of the peripheral part thereof are schematically represented.

As represented in FIG. 3, in the column processing circuit 14, the ADC circuits 141 are arranged for each column.

For performing the CDS process at the time of A/D conversion, the ADC circuit 141 reads out the voltage signal SVSL twice from the pixel circuit 11.

In the first read-out process, the ADC circuit 141 reads out a voltage signal SVSL at a reset level and performs A/D conversion for the voltage signal SVSL. A period in which the A/D conversion is performed at this time is referred to as a P phase (a first period according to an embodiment of the present invention). The reset level represents a voltage level of the FD at the time when the electric potential of the FD of the pixel circuit 11 is reset to the power source voltage VDD.

In the second read-out process, the ADC circuit 141 reads out electric charges accumulated by the photoelectric conversion device 111 (read-out of a pixel) and performs A/D conversion for a voltage signal SVSL corresponding to the amount of the electric charges. A period in which the A/D conversion is performed at this time is referred to as a D phase (a second period according to an embodiment of the present invention).

When performing the A/D conversion, the ADC circuit 141 converts the voltage of the node ND1 into a clock signal having a frequency corresponding to the voltage (V/F conversion) and counts the clock signals.

For high-speed A/D conversion, counting of lower bits and counting of higher bits are performed by individual counters in the ADC circuit 141.

In a case where the resolution of the A/D conversion is N bit, assuming that the lower bits positioned on the LSB side are M bits, the upper bits on the MSB (Most Significant Bit) side are (N−M) bits.

For performing such A/D conversion, each ADC circuit 141 has a VCO 1411a and counters (CNT) 1412a, 1412b, and 1412c.

The VCO 1411a (a clock signal generating section according to an embodiment of the present invention) is disposed for performing the V/F conversion and generates a clock signal in accordance with the voltage signal SVSL.

The counter 1412a (a first counter section according to an embodiment of the present invention), for example, is a base-"$2^M$" counter that can count numbers corresponding to M bits. The counter 1412a also serves as a frequency divider and counts the lower bits of the clock signal that is output by the VCO 1411a.

The counter 1412b, for example, is a base-"$2^{(N-M)}/2$" counter that can count numbers corresponding to (N−M)/2 bits. In addition, the counter 1412b also serves as a frequency divider and counts a half of the upper bits of the clock signal that is output by the counter 1412a.

The counter 1412c (a second counter section according to an embodiment of the present invention), for example, is a base-"$2^{(N-M)}/2$" counter that can count numbers corresponding to the upper (N−M)/2 bits. The counter 1412c counts a half of the upper bits of the clock signal that is output by the counter 1412b.

When a high-level CE signal SCE is input from the control circuit 16, the counters 1412a to 1412c count the input clock signals and output count values to the DPU 17.

In addition, the counters 1412a to 1412c also have a reset function for resetting the count value to zero.

The VCO 1411a generates a clock signal in accordance with the voltage signal SVSL.

However, the VCO 1411a may be influenced by temperature, a power source voltage, the frequency characteristics of transistors, or the like. Thus, even when the input voltage of the VCO 1411a is constant, the oscillation frequency may be unstable.

As a result, variations in the count value counted by the counter 1412a may easily occur. In order to perform stable counting with high accuracy, it is preferable that not only the input voltage of the VCO 1411a but also the oscillation frequency is constant.

Accordingly, a PLL circuit (A) (a (first) phase locked loop according to an embodiment of the present invention) for correcting the oscillation frequency of the VCO 1411a to be constant is formed.

However, the PLL circuit (A) is formed before counting is started for the P phase (a correction period to be described later).

The PLL circuit (A) operates so as to decrease a phase difference between the phase of the clock signal and the phase of the reference clock signal CKref of a predetermined frequency that is supplied to a signal line L1. When there is no phase difference (locked state), the clock signal output by the VCO 1411a is synchronized with the reference clock signal CKref, and thereby the output of the VCO 1411a is corrected to be constant.

When the PLL circuit (A) is formed for the P phase as described above, the oscillation frequency of the VCO 1411a is stable. Accordingly, stable counting with high accuracy can be performed.

In order to count the upper bits at a high speed, a PLL circuit (B) (a second phase locked loop according to an embodiment of the present invention) is formed by a VCO 1411b (a second voltage-controlled oscillator according to an embodiment of the present invention), the counter 1412b, and the like.

The PLL circuit (B) sets the clock signal output by the counter 1412a as a reference signal and synchronizes the reference signal with the output signal of the counter 1412b, thereby multiplying the frequency of the reference signal by a desired multiplying factor.

When the PLL circuit (B) is in the locked state, the counter 1412c performs counting based on the output signal, which has the multiplied frequency, of the counter 1412b.

As a result, the counting of the upper (N−M)/2 bits positioned on the MSB side, which is performed by the counter 1412c, can be performed at a high speed.

[Configuration Example of ADC Circuit 141]

The configuration example of the ADC circuit 141 will be described with reference to FIG. 4.

Figure 4:
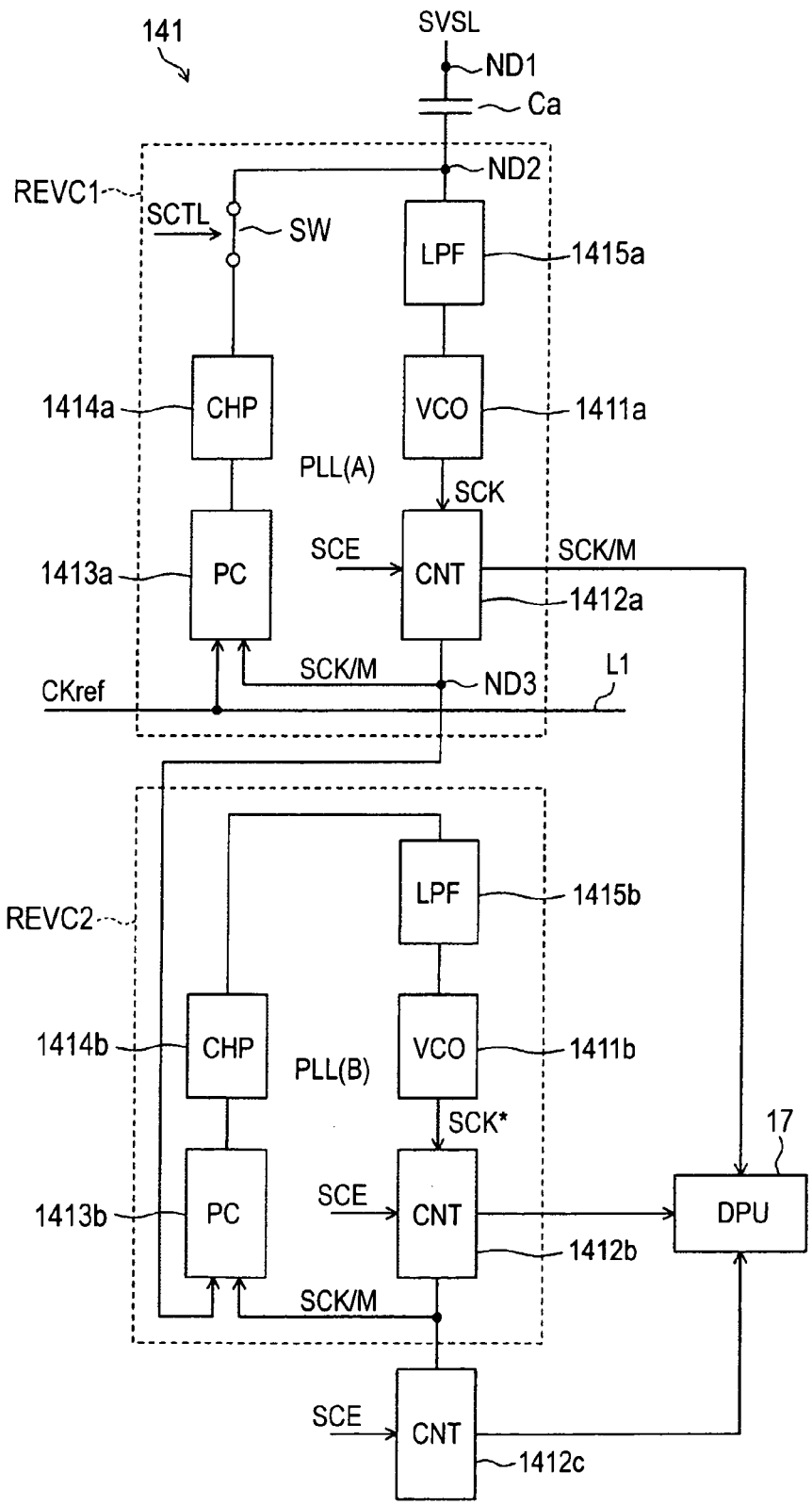
FIG. 4 is a schematic diagram representing a configuration example of an ADC circuit according to the first embodiment of the present invention.

FIG. 4 is a schematic diagram representing a configuration example of an ADC circuit according to the first embodiment of the present invention.

In FIG. 4, an n-th ADC circuit 141 is shown.

As illustrated in FIG. 4, the ADC circuit 141 has VCOs 1411a and 1411b, counters (CNT) 1412a to 1412c, phase comparators (PC) 1413a and 1413b, charge pumps (CHP) 1414a and 1414b, and low pass filters (LPF) 1415a and 1415b. In addition, each ADC circuit 141 has a capacitor Ca and a clamp switch SW.

[Connection Form of PLL Circuit (A)]

As represented in FIG. 4, the PLL circuit (A) is formed by the VCO 1411a, the counter 1412a, the phase comparator 1413a, the charge pump 1414a, the low pass filter 1415a, and the clamp switch SW.

The constituent elements of the PLL circuit (A) employ connection forms as described below.

The input side of the low pass filter 1415a is connected to a node ND2. The output side of the low pass filter 1415a is connected to a control terminal of the VCO 1411a.

In addition, in order to cut a DC (direct current) component of a voltage signal that is output to a node ND1, the capacitor Ca is connected between the node ND1 and the node ND2.

The output terminal of the VCO 1411a is connected to the input terminal of the counter 1412a.

A first output terminal of the counter 1412a is connected to a first input terminal of the phase comparator 1413a and a second input terminal of the phase comparator 1413b through a node ND3. A second output terminal of the counter 1412a is connected to the DPU 17.

A second input terminal of the phase comparator 1413a is connected to a signal line L1. The output terminal of the phase comparator 1413a is connected to the input terminal of the charge pump 1414a.

The output terminal of the charge pump 1414a is connected to the node ND2 through the clamp switch SW.

However, the PLL circuit (A) is formed only during a correction period in which the clamp switch SW is maintained in the ON state. In addition, in FIG. 4, the clamp switch SW is represented to be in the ON state.

[Connection Form of PLL Circuit (B)]

The PLL circuit (B) is formed by the VCO 1411b, the counter 1412b, the phase comparator 1413b, the charge pump 1414b, and the low pass filter 1415b, so that the clock signal as the output count value of the counter 1412a is used as a reference signal.

The constituent elements of the PLL circuit (B) employ a connection form as described below.

The input side of the low pass filter 1415b is connected to the output terminal of the charge pump 1414b. The output side of the low pass filter 1415b is connected to a control terminal of the VCO 1411b.

The output terminal of the VCO 1411b is connected to the input terminal of the counter 1412b.

A first output terminal of the counter 1412b is connected to a first input terminal of the phase comparator 1413b and the input terminal of the counter 1412c. A second output terminal of the counter 1412b is connected to the DPU 17.

A second input terminal of the phase comparator 1413b is connected to the node ND3. The output terminal of the phase comparator 1413b is connected to the input terminal of the charge pump 1414b.

The output terminal of the charge pump 1414b is connected to the input side of the low pass filter 1415b.

The PLL circuit (A) corrects not only the input voltage of the VCO 1411a but also the oscillation frequency thereof. Thus, the PLL circuit (A) is also referred to as a first correction section REVC1.

The PLL circuit (B) multiplies the frequency of the output signal of the PLL circuit (A). In other words, the frequency of the output signal of the counter 1412a is corrected to be increased. Thus, the PLL circuit (B) is also referred to as a second correction section REVC2.

[PLL Circuit (A): Configuration Example of VCO 1411a]

Hereinafter, the constituent elements of the PLL circuit (A) will be described. First, the configuration example of the VCO 1411a will be described with reference to FIG. 5.

Figure 5:
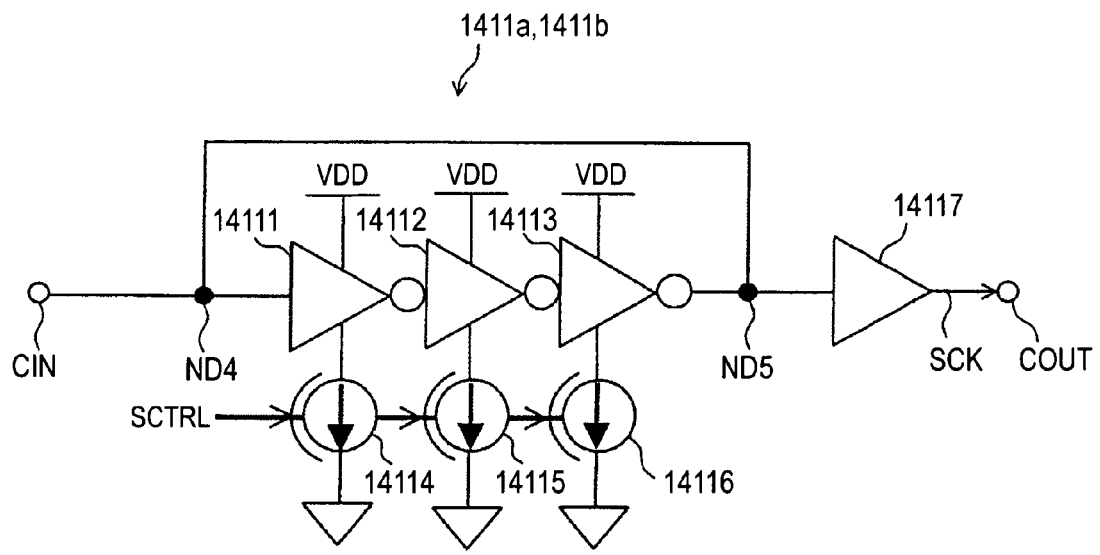
FIG. 5 is an equivalent circuit diagram representing a configuration example of a VCO according to the first embodiment of the present invention.

FIG. 5 is an equivalent circuit diagram representing a configuration example of a VCO according to the first embodiment of the present invention.

The VCO 1411a represented in FIG. 5 is a ring oscillator-type VCO in this embodiment. In addition, the configuration of the VCO 1411b is the same as that of the VCO 1411a.

The VCO 1411a has three inverters 14111 to 14113, constant current sources 14114 to 14116 that can change the current amounts, and a comparator 14117.

The input terminal of the inverter 14111 of the first stage is connected to a control terminal CIN of the VCO 1411a. In addition, the control terminal CIN is connected to the output side of the low pass filter 1415a.

The inverters 14111 to 14113 are connected in a ring pattern, so that the output of each inverter is input to the inverter of the next stage. In addition, a node ND4 and a node ND5 are connected to each other, so that the output of the inverter 14113 of the final stage feeds back to the inverter 14111 of the first stage.

A first power source connection terminal of each of the inverters 14111 to 14113 is connected to the power source voltage VDD. In addition, second power source connection terminals of the inverters 14111 to 14113 are connected to the constant current sources 14114 to 14116.

The input terminal of the comparator 14117 is connected to the node ND5, and the output terminal of the comparator 14117 is connected to the output terminal COUT of the VCO 1411a.

An example of the operation of the VCO 1411a will now be described.

When a voltage signal (analog signal) SVSL is supplied to the control terminal CIN of the VCO 1411a from the pixel circuit 11, the inverter 14113 of the final stage outputs a signal having a phase opposite to that of a signal input to the inverter 14111 of the first stage. The output of the inverter 14113 of the final stage feeds back to the input of the inverter 14111 of the first stage, and accordingly, the signal input to the inverter 14111 of the first stage oscillates.

The comparator 14117, for example, compares the output of the inverter 14113 of the final stage with the ground electric potential and outputs only a signal of a high level.

Accordingly, the comparator 14117 outputs the pulsed clock signal SCK to the output terminal COUT.

In addition, the number of the inverters may be an odd number for which oscillation can be generated, and an appropriate number (for example, five) of the inverters can be connected in a ring pattern.

When the ring oscillator-type VCO 1411a is used, the circuit configuration is simplified, and the layout area of the VCO 1411a can be decreased.

As a result, the layout area of the column processing circuit can be decreased, compared to a case where a voltage comparator is used.

Figure 6:
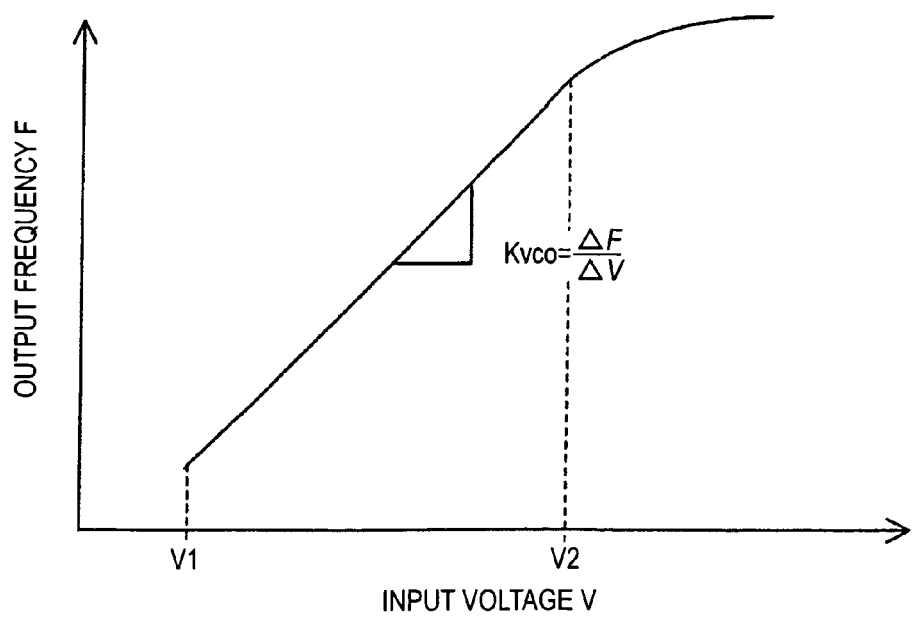
FIG. 6 is a diagram representing an example of a relationship between the input voltage and the output frequency of the VCO according to the first embodiment of the present invention.

FIG. 6 is a diagram representing an example of the relationship between the input voltage and the output frequency of the VCO according to the first embodiment of the present invention.

As shown in FIG. 6, the VCO 1411a outputs a clock signal SCK (see FIG. 5) that has a higher oscillation frequency F as the input voltage V is increased. In a case where the input voltage V is in the range of voltages V1 to V2, the change ratio KVCO ($=\Delta F/\Delta V$) of the output frequency F to the input voltage V is constant.

In other words, the VCO 1411a generates a clock signal SCK having a frequency F that is in proportion to the input voltage V in the range of voltages V1 to V2.

In addition, the relationship between the voltage and the output frequency of the VCO 1411b is the same as that of the VCO 1411a. Hereinafter, it is assumed that the input voltage V is in the range of voltages V1 to V2.

In the locked state, the oscillation frequency F of the VCO 1411a is fixed to "M×F (CKref)". Here, M denotes a frequency division ratio, and F (CKref) denotes the frequency of the reference clock signal CKref.

The oscillation frequency F can be adjusted by controlling the amounts of currents of the constant current sources 14114 to 14116 shown in FIG. 5. In such a case, by outputting the control signal SCTRL of the control circuit 16 to the constant current sources 14114 to 14116, the amounts of currents of the constant current sources 14114 to 14116 are changed.

[PLL Circuit (A): Detailed Description of Counter 1412a]

When the clock signal SCK is input from the VCO 1411a, the counter 1412a performs up-counting of the clock signals SCK during the period in which the CE signal SCE input from the control circuit 16 has the high level. Alternatively, this counting operation may be down counting.

After completing the counting operation, the counter 1412a stores a count value in a memory (not shown) disposed inside the ADC circuit 141. Thereafter, when a selection signal SH is input from the horizontal scanning circuit 15, the counter 1412a outputs the count value to the DPU 17.

The counter 1412a also outputs the count value to the first input terminal of the phase comparator 1413a and the second input terminal of the phase comparator 1413b as a clock signal.

Here, the clock signal output by the counter 1412a is acquired by dividing the frequency of the clock signal SCK at the ratio of 1/M.

[PLL Circuit (A): Phase Comparator 1413a]

The phase comparator 1413a compares the phase (frequency) of the clock signal SCK/M of which the frequency is divided by the counter 1412a with the phase (frequency) of the reference clock signal CKref supplied to the signal line L1. The phase comparator 1413a generates a voltage that is in proportion to a phase difference (frequency difference) between the two signals and outputs the generated voltage to the charge pump 1414a.

[PLL Circuit (A): Charge Pump 1414a]

The charge pump 1414a increases the voltage input from the phase comparator 1413a and outputs the increased voltage to the low pass filter 1415a.

[PLL Circuit (A): Low Pass Filter 1415a]

When the voltage signal SVSL is supplied to the node ND2, the low pass filter 1415a equalizes the voltage that has been rapidly increased by the charge pump 1414a by eliminating a high-frequency component of the voltage signal SVSL and a high-frequency component generated by the phase comparator 1413a.

[PLL Circuit (A): Clamp Switch SW]

The clamp switch SW is maintained in the ON or OFF state based on the control signal SCTL of the control circuit 16. In particular, the clamp switch SW is maintained in the ON state when the control signal SCTL has the high level. On the other hand, the clamp switch SW is maintained in the OFF state when the control signal SCTL has the low level.

When the clamp switch SW is in the ON state, the PLL circuit (A) is formed, and accordingly, the oscillation frequency of the VCO 1411a is corrected.

On the other hand, when the clamp switch SW is in the OFF state, the formation of the PLL circuit (A) is released, and accordingly, the correction of the oscillation frequency of the VCO 1411a is stopped.

[Detailed Description of PLL Circuit (B)]

The functions of the constituent elements of the PLL circuit (B), that is, the VCO 1411b, the counters 1412b and 1412c, the phase comparator 1413b, the charge pump 1414b, and the low pass filter 1415b are basically the same as those of the PLL circuit (A).

However, the PLL circuit (B) sets the clock signal SCK/M of which the frequency is divided by the counter 1412a as a reference signal and multiplies the frequency of the clock signal regardless of the ON or OFF state of the clamp switch SW.

[PLL Circuit (B): Detailed Description of Counter 1412b]

Hereinafter, constituent elements different from those of the PLL circuit (A) will be described.

When the clock signal SCK* is input from the VCO 1411b, the counter 1412b performs up-counting of the clock signals SCK* during the period in which the CE signal SCE input from the control circuit 16 has the high level. Alternatively, this counting operation may be down counting.

After completing the counting operation, the counter 1412b stores a count value in the memory (not shown) disposed inside the ADC circuit 141. Thereafter, when a selection signal SH is input from the horizontal scanning circuit 15, the counter 1412b outputs the count value to the DPU 17.

The counter 1412b also outputs an output clock signal as the count value to the first input terminal of the phase comparator 1413b and the counter 1412c.

[PLL Circuit (B): Phase Comparator 1413b]

The phase comparator 1413b compares the phase of the clock signal SCK/M of which the frequency is divided by the counter 1412a with the phase of the output clock signal of the counter 1412b.

The phase comparator 1413b generates a voltage that is in proportion to a phase difference between the two signals and outputs the generated voltage to the charge pump 1414b.

In a case where the PLL circuit (B) is in the locked state, and both the signals are synchronized with each other, the output clock signal of the counter 1412b is the clock signal SCK/M.

[Example of Operations of PLL Circuit (A) and PLL Circuit (B)]

An example of the operations of the PLL circuit (A) as the first correction section REVC1 and the PLL circuit (B) as the second correction section REVC2 will be described in association with the operations of the counters 1412a to 1412c, with reference to FIGS. 4 and 7A to 7C.

Figure 7:
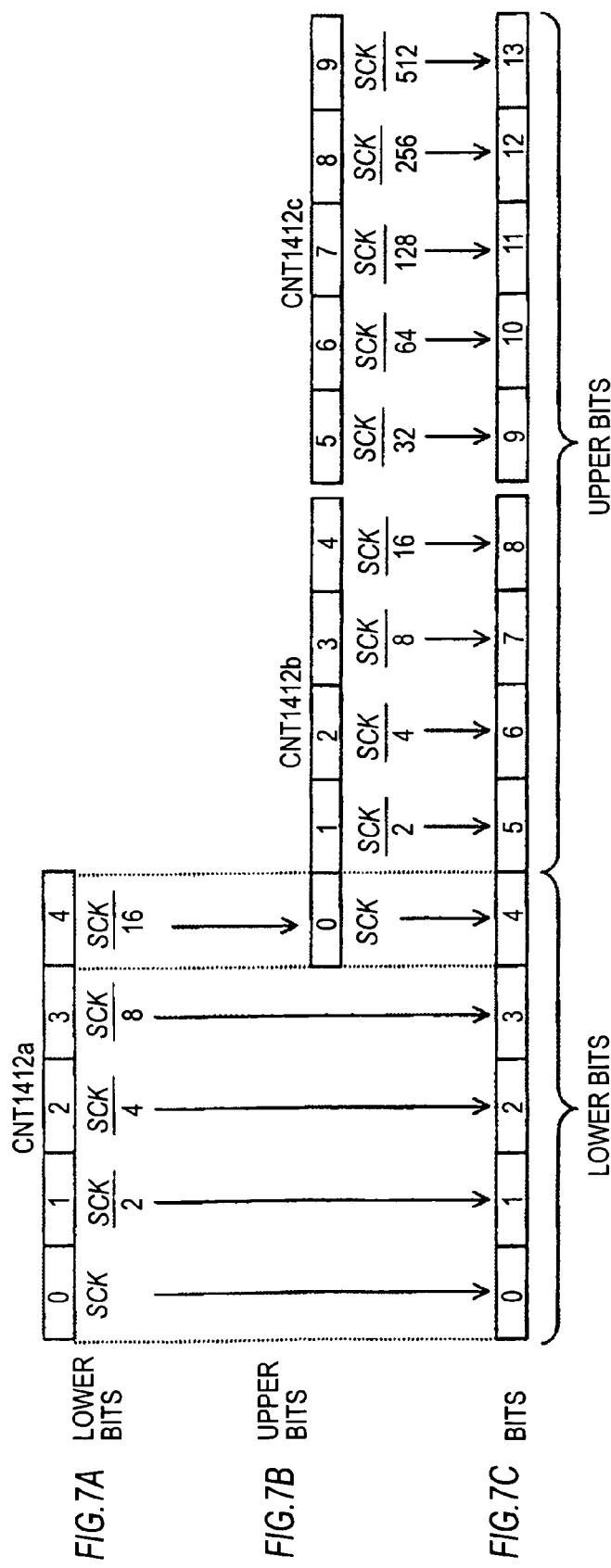
FIGS. 7A to 7C are diagrams for illustrating the example of the operations of the PLL circuit (A) and the PLL circuit (B) according to the first embodiment of the present invention.

FIGS. 7A to 7C are diagrams for illustrating the example of the operations of the PLL circuit (A) and the PLL circuit (B) according to the first embodiment of the present invention.

FIG. 7A is a diagram showing an example of counting the lower bits by using the counter 1412a.

FIG. 7B is a diagram showing an example of counting the upper bits by using the counters 1412b and 1412c.

FIG. 7C is a diagram representing the count value that is output to the DPU 17.

As illustrated in FIG. 4, when the clamp switch SW changes from the OFF state to the ON state, the PLL circuit (A) is formed. When the voltage signal SVSL is supplied to the node ND2, the PLL circuit (A) synchronizes the clock signal output by the VCO 1411a with the reference clock signal CKref.

As described above, even when the input voltage of the VCO 1411a is constant, the oscillation frequency thereof may be unstable.

However, as the PLL circuit (A) is in the locked state, the change ratio KVCO ($=\Delta F/\Delta V$) illustrated in FIG. 6 is constant, and the clock signal SCK output by the VCO 1411a is corrected to be constant.

In addition, when the input voltage of the VCO 1411a is denoted by V, the change ratio is denoted by KVCO, and the frequency division ratio of the PLL circuit (B) is denoted by M1, the PLL circuit (A) outputs the clock signal of an output frequency F(PLL(A)) represented in the following equation to the PLL circuit (B).

$$F(PLL(A)) = V \times KVCO/M1 \qquad \text{Equation (1)}$$

On the other hand, the PLL circuit (B) multiplies the frequency of the clock signal SCK/M by setting the clock signal SCK/M output by the counter 1412a as a reference signal and synchronizing the clock signal SCK* output by the VCO 1411b with the reference signal.

In addition, when the output frequency of the PLL circuit (A) is denoted by F(PLL(A)), and the frequency division ratio of the counter 1412b is denoted by M2, the PLL circuit (B) outputs the clock signal SCK* of an output frequency F(PLL(B)) represented in the following equation to the counter 1412c.

$$F(PLL(B)) = F(PLL(A)) \times M2 \qquad \text{Equation (2)}$$

By using Equation (1), F(PLL(B)) can be represented as the following equation.

$$F(PLL(B)) = V \times KVCO(M2/M1) \qquad \text{Equation (3)}$$

Thereafter, in order to prevent the influence of switching noise due to the clamp switch SW or the like, the clamp switch SW is changed from the ON state to the OFF state. When a CE signal SCE of the high level is input, the counter 1412a starts to count the clock signals SCK.

In the description below, it is assumed that the resolution of the AD conversion is 14 bits and the counters 1412a to 1412c are base-$2^5$ counters.

As illustrated in FIG. 7A, the counter 1412a counts the lower 5 bits. In other words, as illustrated in FIG. 7C, the counter 1412a generates a count value from the 0-th bit to the 4-th bit.

In such a case, the counter 1412a divides the frequency of the clock signals SCK at the ratio of 1/2 each time one bit is counted.

As a result, as illustrated in FIG. 7A, when the counter 1412a counts the 4-th bit (the 4-th bit in FIG. 7C), the frequency of the clock signal SCK is divided at the ratio of $1/2^4=1/16$.

On the other hand, when a CE signal SCE of the high level is input, the counter 1412b starts to count the clock signals SCK/M output by the counter 1412a as well.

As illustrated in FIG. 7B, the counter 1412b generates a count value of 4 bits (in FIG. 7C, the 5-th bit to the 8-th bit) positioned on the LSB (Least Significant Bit) side out of the upper 9 bits.

However, when the clamp switch SW is changed to be in the OFF state, the count value of the counter 1412b is reset.

As a result, the counter 1412b starts to count from zero. Each time when the counter 1412b counts one bit, the frequency of the clock signal SCK* is divided at the ratio of 1/2. As illustrated in FIG. 7B, when the counter 1412b counts the 4-th bit (the 8-th bit illustrated in FIG. 7C), the frequency of the clock signal SCK output by the VCO 1411a is divided at the ratio of $1/2^4=1/16$.

In addition, since the resolution of A/D conversion is assumed to be 14 bits, in the count value of the 4-th bit shown in FIG. 7C, the value of the 4-th bit illustrated in FIG. 7A is used.

As illustrated in FIG. 7B, the counter 1412c generates the count value for five bits (the 9-th to 13-th bits in FIG. 7C) positioned on the MSB side out of the upper 9 bits.

When a CE signal SCE of the high level is input, the counter 1412c starts to count the clock signals SCK/M output by the counter 1412b.

Each time when one bit is counted, the counter 1412c divides the frequency of the clock signal SCK/M at the ratio of 1/2. However, to the counter 1412c, the output clock signal of the counter 1412b of which the frequency is multiplied by the PLL circuit (B) is input.

Accordingly, as illustrated in FIG. 7C, when the counter 1412c counts the 9-th bit, the frequency of the clock signal SCK is divided at the ratio of $1/2^5=1/32$. When the counter 1412c counts the 13-th bit, the frequency of the clock signal SCK is divided at the ratio of $1/2^9=1/512$.

The final count value is a sum of count values counted by the counters 1412a to 1412c.

However, in counting by using the counter 1412c, the counting is frequency-multiplied by 32 (=512/16). Thus, the count value may need to be multiplied by a multiplying factor TM (in this case, TM=32).

In the description above, out of 14 bits, 5 bits positioned on the LSB side are set to be the lower bits, and 9 bits positioned on the MSB side are set to be the upper bits. However, the ratio of the lower bits to the upper bits may be appropriately set.

Accordingly, the frequency division ratio of each counter 1412a to 1412c can be appropriately set.

For example, counting may be performed only by the counters 1412a and 1412c without counting by using the counter 1412b. In such a case, for example, it is preferable that each of the counters 1412a and 1412c performs 7-bit counting.

[Example of Operation of Pixel Circuit 11]

Hereinafter, the operation of the CMOS image sensor 1 will be described. First, an example of the operation of the n-th pixel circuit 11 arranged in the m-th row will be described with reference to FIGS. 2 and 8A to 8C.

Figure 8:
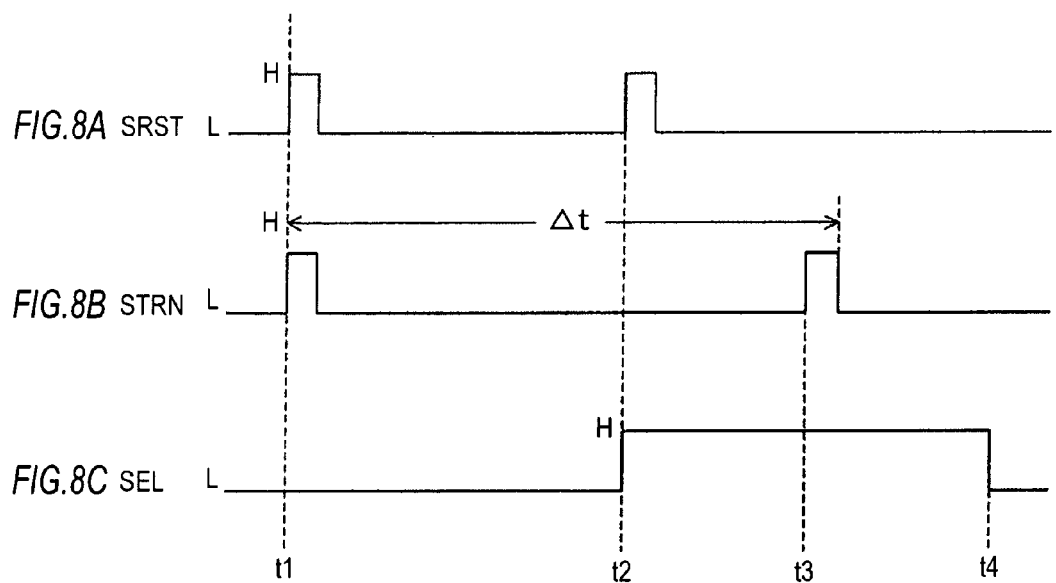
FIGS. 8A to 8C are timing charts illustrating an example of the operation of a pixel circuit according to the first embodiment of the present invention.

FIGS. 8A to 8C are timing charts illustrating an example of the operation of a pixel circuit according to the first embodiment of the present invention.

FIG. 8A represents a reset signal SRST that is supplied to the reset signal line LRST(m).

In addition, FIG. 8B represents a transmission signal STRN that is supplied to the transmission signal line LTRN(m).

FIG. 8C represents a selection signal SEL that is supplied to the selection signal line LSEL(m).

First, a reset operation (electronic shutter) is performed for the pixel circuit 11 arranged in the m-th row.

At time t1, the row driving circuit 13, as illustrated in FIG. 8A, supplies a pulsed reset signal SRST to the reset signal line LRST(m).

Simultaneously, the row driving circuit 13, as illustrated in FIG. 8B, supplies a pulsed transmission signal STRN to the transmission signal line LTRN(m).

The transmission transistor 112 and the reset transistor 113 are simultaneously in the ON state during a period of a pulse width.

As the electric charges accumulated in the photoelectric conversion device 111 are transmitted to the FD, the electric charges accumulated in the photoelectric conversion device 111 are discharged to the power source voltage VDD. Simultaneously, the electric potential of the FD is reset to the power source voltage VDD.

After resetting the electric potential of the FD, the photoelectric conversion device 111 receives incident light, thereby starting to accumulate electric charges. A period during which the pixel circuit 11 accumulates the electric charges is a period denoted by an electric charge accumulating time Δt. Thereafter, the electric charges accumulated in the pixel circuit 11 are read out.

At time t2, the row driving circuit 13, as illustrated in FIG. 8C, supplies a selection signal SEL of the high level to the selection signal line LSEL(m) until time t4 when the read-out operation for the electric charges is completed.

The selection transistor 115 of the pixel circuit 11 is maintained in the ON state until the read-out operation for the electric charges of the pixel circuits 11 disposed in the same row is completed.

In addition, the row driving circuit 13, as illustrated in FIG. 8A, supplies a pulsed reset signal SRST to the reset signal line LRST(m).

Accordingly, the electric potential of the FD is reset to the power source voltage VDD once. At this time, the electric potential of the FD is output to the node ND1 on the vertical signal line LVSL(n) as the voltage signal SVSL.

At this time, the voltage signal SVSL output to the node ND1 is input to the column processing circuit 14.

The ADC circuit 141 of the column processing circuit 14 performs A/D conversion for the input voltage signal SVSL (P phase).

At time t3, the row driving circuit 13, as illustrated in FIG. 8B, supplies a pulsed transmission signal STRN to the transmission signal line LTRN(m). The transmission transistor 112 is in the ON state during a period of a pulse width. At this time, the reset transistor 113 is maintained in the OFF state, and accordingly, the electric charges accumulated in the photoelectric conversion device 111 are transmitted to the FD. Then, the electric potential of the FD is amplified by the amplifier transistor 114.

As shown in FIG. 2, the source follower circuit is formed by the amplifier transistor 114 and the current source 18.

Accordingly, a bias current flows between the current source 18 and the amplifier transistor 114, and the amplified voltage signal is output to the node ND1 on the vertical signal line LVSL(n) through the selection transistor 115.

Thereafter, the voltage signal SVSL output to the node ND1 is input to the ADC circuit 141 of the column processing circuit 14 (D Phase).

[Example of Operation of Column Processing Circuit 14]

The operation of the CMOS image sensor 1 will be described with a focus on the operation of the n-th column processing circuit 14 shown in FIG. 4.

FIGS. 9A to 9J are timing charts illustrating an example of the operation of a column processing circuit according to the first embodiment of the present invention.

Figure 9:
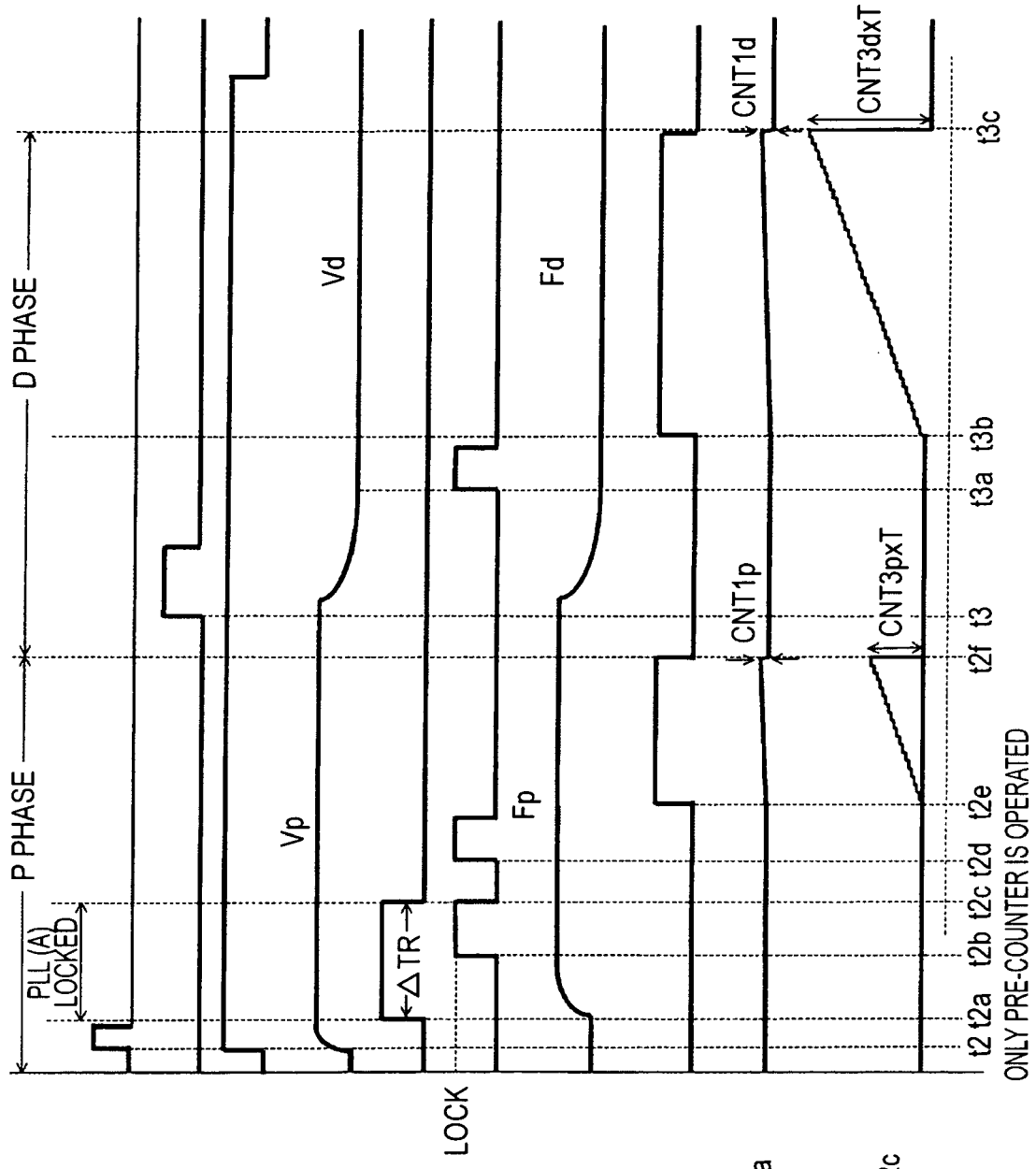
FIGS. 9A to 9J are timing charts illustrating an example of the operation of a column processing circuit according to the first embodiment of the present invention.

FIG. 9A illustrates a reset signal SRST, and FIG. 9B illustrates a transmission signal STRN.

In addition, FIG. 9C illustrates a selection signal SEL.

FIG. 9D illustrates a voltage signal SVSL.

FIG. 9E illustrates a control signal SCTL for controlling turning on or off of the clamp switch SW.

FIG. 9F illustrates a locked state of the PLL circuit (B).

FIG. 9G illustrates the oscillation frequency F(VCO) of the VCO 1411a.

FIG. 9H illustrates a CE signal SCE.

FIG. 9I illustrates a count value of the counter 1412a, and FIG. 9J illustrates a count value of the counter 1412c.

The count value illustrated in FIG. 9J is multiplied by a multiplying factor TM. In addition, time t2 and time t3 shown in FIGS. 9A to 9J correspond to time t2 and time t3 shown in FIGS. 8A to 8C.

[Operation of Column Processing Circuit 14 for P Phase]

The operation of the column processing circuit 14 for the P phase will be described.

At time t2, as illustrated in FIG. 9A, when a pulsed reset signal SRST is supplied to the gate of the reset transistor 113. Together with the supply of the reset signal SRST, as illustrated in FIG. 9C, a selection signal SEL of the high level is supplied to the gate of the selection transistor 115.

Accordingly, the electric potential of the FD is reset to the power source voltage VDD once. At this time, as illustrated in FIG. 9D, the electric potential of the FD is output to the node ND1 on the vertical signal line LVSL(n) as the voltage signal SVSL.

At time t2, the voltage of the voltage signal SVSL rapidly rises. At time t2a when the voltage of the voltage signal SVSL has an approximately constant voltage value Vp, the control circuit 16 outputs a control signal SCTL of the high level to the clamp switch SW.

Accordingly, the clamp switch SW is maintained in the ON state during a period from time t2a to time t2c. The period from time t2a to t2c is referred to as a correction period ΔTR.

During the correction period ΔTR, the PLL circuit (A) is formed as the first correction section REVC1. Then, the PLL circuit (A) synchronizes the clock signal SCK output by the VCO 1411a with the reference clock signal CKref.

Accordingly, as illustrated in FIG. 9G, the PLL circuit (A) is in the locked state, and the oscillation frequency F of the VCO 1411a is corrected to a constant oscillation frequency Fp.

By forming the PLL circuit (A) during this correction period ΔTR, the oscillation frequency of the VCO 1411a becomes stable. Accordingly, a counting operation performed thereafter can be performed with high accuracy.

On the other hand, when the clock signal SCM/M output by the counter 1412a is set as a reference signal, and the clock signal output by the VCO 1411b is synchronized with the reference signal, as illustrated in FIG. 9F, the PLL circuit (B) is in the locked state at time t2b. As a result, the frequency of the clock signal SCM/M is multiplied.

Since the clock signal SCK is input to the counters 1412a and 1412b, the counters 1412a and 1412b operate even during the correction period ΔTR. However, as illustrated in FIG. 9H, the CE signal SCE has the low level during the correction period ΔTR, and accordingly, the counters 1412a and 1412b do not output the count values to the DPU 17.

As illustrated in FIG. 9F, at time t2c, when the PLL circuit (A) and the PLL circuit (B) are in the locked state, the control circuit 16 shifts the control signal SCTL of the high level to the low level from the high level.

Accordingly, the clamp switch SW is maintained in the OFF state.

When the clamp switch SW is changed to be in the OFF state, the forming of the PLL circuit (A) is released. Accordingly, the oscillation frequency of the VCO 1411a changes in accordance with the voltage signal SVSL.

Since the PLL circuit (B) is formed, for example, as illustrated in FIG. 9F, the PLL circuit (B) is again in the locked state at time t2d.

After the PLL circuit (B) is in the locked state, at time t2e, the control circuit 16 outputs the CE signal SCE of the high level to the counters 1412a to 1412c until time t2f.

During the period in which the CE signal SCE has the high level, the counter 1412a performs up-counting of the clock signals SCK that are output by the VCO 1411a.

Similarly, the counter 1412b performs up-counting of the output clock signals SCK/M of the counter 1412a.

In addition, the counter 1412c performs up-counting of the output clock signals SCK/M of the counter 1412b.

At time t2f, it is assumed that the count value of the counter 1412a is CNT1p, the count value of the counter 1412b is CNT2p, and the count value of the counter 1412c is CNT3p.

However, the counting operation performed by the counter 1412c has the frequency that is multiplied by the PLL circuit (B). Accordingly, the actual count value is "multiplying factor TM×count value CNT3p".

At time t2f when the counting operation is completed, the counters 1412a to 1412c store the count values CNT1p, CNT2p, and CNT3p in a memory (not shown) disposed inside the ADC circuit 141.

[Operation of Column Processing Circuit 14 for D Phase]

The operation of the column processing circuit 14 for the D phase will be described.

At time t3, as illustrated in FIG. 9B, when a pulsed transmission signal STRN is supplied to the transmission signal line LTRN(m), the electric charges accumulated in the photoelectric conversion device 111 are transmitted to the FD.

The voltage signal amplified by the amplifier transistor 114 is output to the node ND1 on the vertical signal line LVSL(n) through the selection transistor 115.

At this time, as illustrated in FIG. 9D, the voltage signal SVSL slowly drops from the voltage value Vp to the voltage value Vd.

For the D phase, as illustrated in FIG. 9E, the control signal SCTL has the low level, the clamp switch SW is maintained in the OFF state. Accordingly, the forming of the PLL circuit (A) is released.

The VCO 1411a, as illustrated in FIG. 9G, outputs a clock signal SCK of the oscillation frequency corresponding to the voltage slowly dropping from the voltage value Vp to the voltage value Vd to the counter 1412a.

As the oscillation frequency of the VCO 1411a changes momentarily, the clock signal SCK output by the counter 1412a also changes from time to time. Finally, as illustrated in FIG. 9D, the voltage signal SVSL is stabilized to have the voltage value Vd at time t3a.

However, the PLL circuit (B) sets the clock signal SCK/M output by the counter 1412a as a reference signal and synchronizes the clock signal SCK/M with the reference signal. Since the voltage signal SVSL is stabilized to have the voltage value Vd at time t3a, the PLL circuit (B), as illustrated in FIG. 9F, is in the locked state.

Here, before counting is started for the D phase, the control circuit 16 resets the count values of the counters 1412a to 1412c once by outputting a reset signal to the counters 1412a to 1412c.

At time t3b when the PLL circuit (B) is in the locked state, the control circuit 16 outputs the CE signal SCE of the high level to the counters 1412a to 1412c until time t3c.

During the period in which the CE signal SCE is at the high level, the counter 1412a performs up-counting of the clock signals SCK that are output by the VCO 1411a.

Similarly, the counter 1412b performs up-counting of the clock signals SCK/M that are output by the counter 1412a.

In addition, the counter 1412c performs up-counting of the clock signals SCK/M that are output by the counter 1412b.

At time t3c, it is assumed that the count value of the counter 1412a is CNT1d, the count value of the counter 1412b is CNT2d, and the count value of the counter 1412c is CNT3d.

Similarly to the case of the P phase, the counting operation performed by the counter 1412c has the frequency that is multiplied by 32. Accordingly, the actual count value is "multiplying factor TM×count value CNT3d".

At time t3c when the counting operation is completed, the counters 1412a to 1412c store the count values CNT1d, CNT2d, and CNT3d in a memory (not shown) disposed inside the ADC circuit 141.

Thereafter, the DPU 17 reads out the count values CNT1p, CNT2p, and CNT3p for the P phase and the count values CNT1d, CNT2d, and CNT3d for the D phase from the memory disposed inside the ADC circuit 141.

Then, the DPU 17, as represented in Equations (4) and (5), calculates a sum CP of the count values for the P phase and a sum Cd of the count values for the D phase.

$$Cp = CNT1p + CNT2p + TM \times CNT3p \quad \text{Equation (4)}$$

$$Cd = CNT1d + CNT2d + TM \times CNT3d \quad \text{Equation (5)}$$

As represented in Equations (4) and (5), the DPU 17 multiplies the count values CNT3p and CNT3d of the counter 1412c by the multiplying factor TM.

Next, the DPU 17 calculates the count value ΔCNT as a digital value for the final analog signal as represented in the following equation.

$$\Delta CNT = Cp - Cd \quad \text{Equation (6)}$$

According to the first embodiment described in detail as above, the following advantages can be acquired by forming the PLL circuit (B) and setting the output of the PLL circuit (A) as the reference signal of the PLL circuit (B).

First, A/D conversion can be performed at a higher speed than an ADC circuit that performs general V/F conversion.

Second, a wiring or the like that directly inputs the analog voltage signal SVSL to the PLL circuit (B) does not need to be prepared. Accordingly, there are advantages in that the influence of parasitic capacitance or the like of the wiring needs not to be considered and, for example, multilayer wiring on the PLL circuit (B) is not needed.

Third, the reference clock signal CKref is input to the PLL circuit (A), and accordingly, the circuit configuration of the ADC circuit 141 can be simplified. In particular, a wiring for supplying the reference clock signal CKref needs not to be disposed between the control circuit 16 and the PLL circuit (B). Accordingly, the clock signal SCK can be generated at a high speed.

The above-described oscillation frequency can be stabilized in a speedy manner without depending on the capability of the VCO 1411a. Accordingly, when A/D conversion is performed for the P phase, a stable counting operation can be performed.

In addition, the counters 1412a to 1412c perform counting only during a period in which a CE signal SCE of the high level is received. Accordingly, even when there is a difference in the capabilities of the VCOs 1411a and 1411b, the count value for the D phase can be calculated with high accuracy.

Therefore, not only a time for A/D conversion for the P phase can be shortened, but also the A/D conversion can be performed at a high speed.

The column processing circuit 14 does not use a DAC circuit that generates a ramp-patterned reference voltage or the like or a voltage comparator. Accordingly, a wiring disposed inside the column processing circuit 14 is simplified, and there is an advantage in that the layout area of the column processing circuit 14 can be decreased compared to that of a column processing circuit that uses a DAC circuit or a voltage comparator.

In addition, the transmission line for a signal can be shortened, and accordingly, the driving frequency of the column processing circuit 14 can be raised.

Accordingly, the frame rate or the bit width of a digital signal acquired by A/D conversion can be increased.

When the bit width of the digital signal is increased, a digital gain can be acquired at high precision. Accordingly, there is an advantage in that an analog gain needs not to be applied to an image signal that is output by the CMOS image sensor 1.

The counters 1412a to 1412c operate for a predetermined period unless the count value overflows. Accordingly, the power consumption of the counters 1412a to 1412c varies in a regular pattern.

Therefore, analysis on a noise occurring in the A/D conversion process can be performed in an easy manner.

The clock signals that are output by the VCOs 1411a and 1411b are digital signals of the oscillation frequency.

Accordingly, by suppressing the amplitude of the clock signal to be small, the power consumption of the column processing circuit 14 can be decreased.

As an advantage acquired by suppressing the amplitude of the clock signals that are output by the VCOs 1411a and 1411b, a transitional time of the clock signal that transits from the high level to the low level (or from the low level to the high level) is shortened.

Accordingly, by raising the oscillation frequency of the VCOs 1411a and 1411b, the A/D conversion process can be performed at a higher speed.

2. Second Embodiment

As described above, the PLL circuit (B) is for performing a counting operation at a high speed in the A/D conversion process. Thus, the ADC circuit 141 may be configured without forming the PLL circuit (B).

In a second embodiment, a case where the ADC circuit 141 is configured without forming the PLL circuit (B) will be exemplified, and the advantage of the CMOS image sensor 1 according to the first embodiment will be described.

[Configuration Example of Column Processing Circuit 14a]

Figure 10:
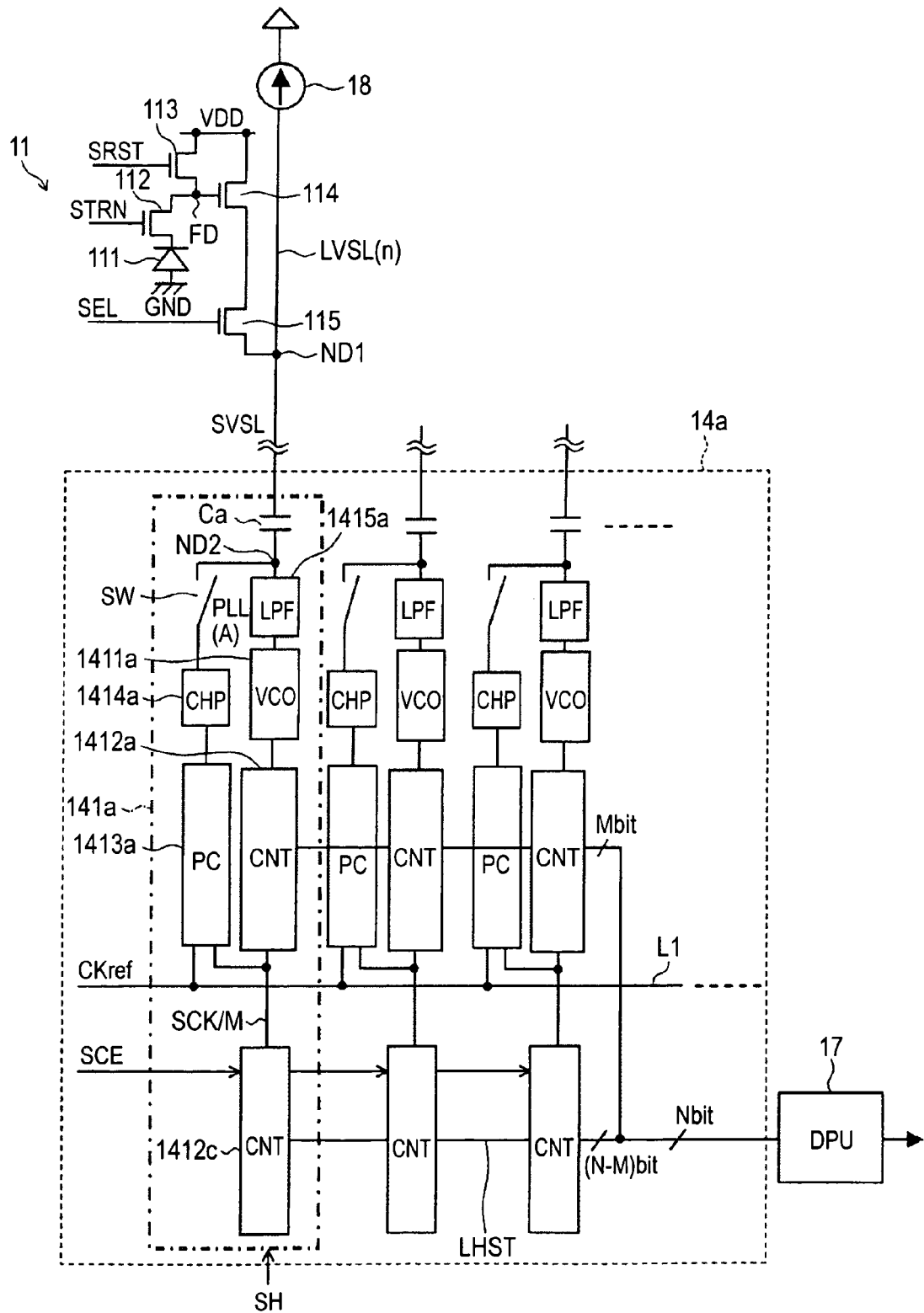
FIG. 10 is a schematic block diagram representing a configuration example of a column processing circuit according to a second embodiment of the present invention.

FIG. 10 is a schematic block diagram representing a configuration example of a column processing circuit according to the second embodiment of the present invention.

As represented in FIG. 10, in an ADC circuit 141a of a column processing circuit 14a, a PLL circuit (A) is configured by a VCO 1411a, a counter 1412a, a phase comparator 1413a, a charge pump 1414a, and a low pass filter 1415a.

However, in FIG. 3, the clamp switch SW is in the OFF state.

In the ADC circuit 141a, similarly to the CMOS image sensor 1 according to the first embodiment, the PLL circuit (B) is not formed, and the output clock signal SCK/M of the counter 1412b is directly input to the counter 1412c.

Then, the counter 1412c performs counting for the upper (N−M) bits based on the clock signal SCK/M.

FIGS. 11A to 11H are timing charts illustrating an example of the operation of a column processing circuit according to the second embodiment of the present invention.

Figure 11:
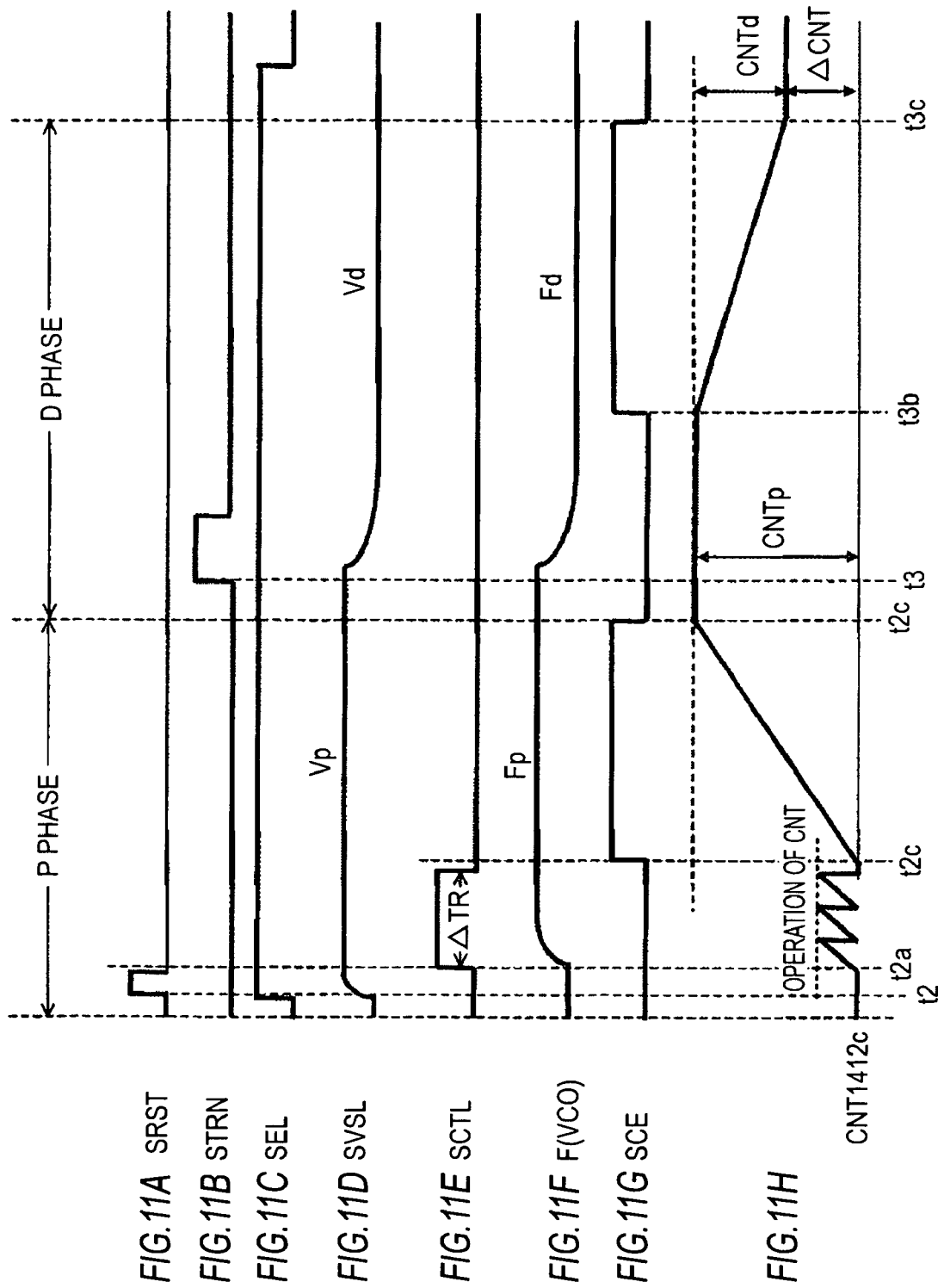
FIGS. 11A to 11H are timing charts illustrating an example of the operation of a column processing circuit according to the second embodiment of the present invention.

FIG. 11A illustrates a reset signal SRST, and FIG. 11B illustrates a transmission signal STRN.

In addition, FIG. 11C illustrates a selection signal SEL.

FIG. 11D illustrates a voltage signal SVSL.

FIG. 11E illustrates a control signal SCTL for controlling turning on or off of the clamp switch SW.

FIG. 11F illustrates the oscillation frequency F(VCO) of the VCO 1411a.

In addition, FIG. 11G illustrates a CE signal SCE.

FIG. 11H illustrates a count value of the counter 1412c.

As illustrated in FIGS. 11A to 11H, the operation of the column processing circuit 14a is basically the same as that of the column processing circuit 14 according to the first embodiment.

However, during a correction period ΔTR illustrated in FIG. 11E, the PLL circuit (A) is not in the locked state, and accordingly, there is a phase difference between the reference clock signal CKref and the output of the counter 1412a.

Therefore, during the correction period ΔTR, only the counter 1412a operates, and the counter 1412a is reset to zero when the count value reaches a maximum value.

The counters 1412a and 1412c perform up-counting for the P phase and perform down-counting from the count value CNTp, which is acquired for the P phase, for the D phase.

When the count value for the D phase is CNTd, the final count value ΔCNT is ΔCNT=CNTp−CNTd as represented in Equation (5).

Figure 12:
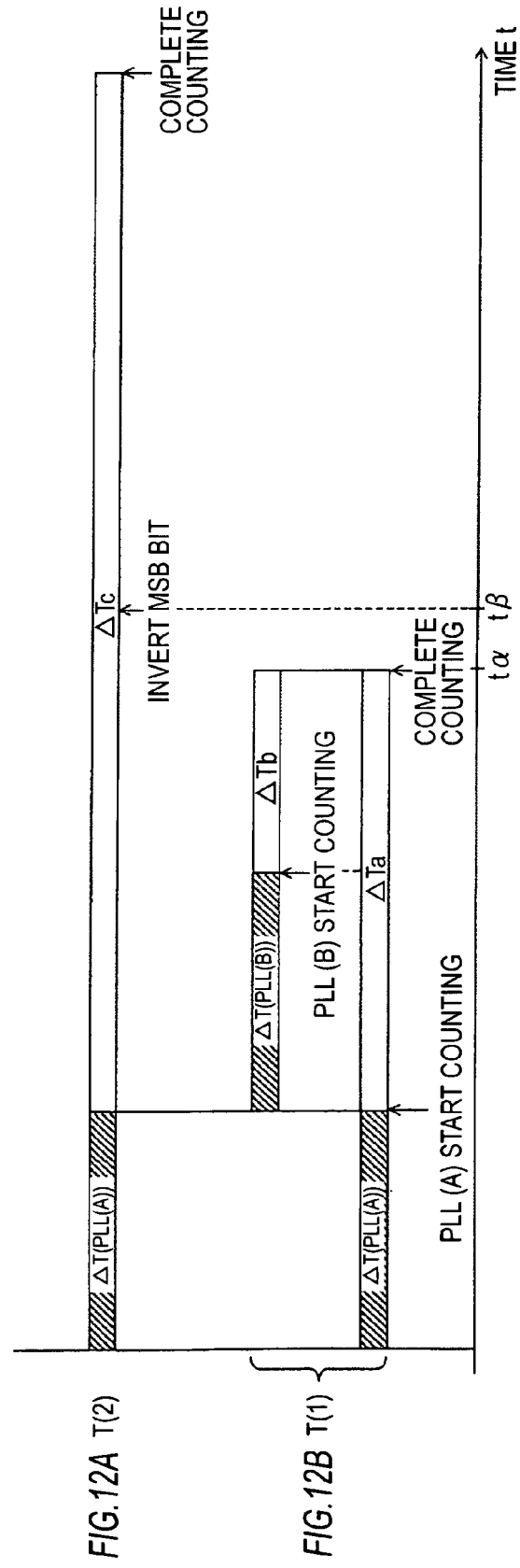
FIGS. 12A and 12B are conceptual diagrams representing an example of the comparison between a time that may be needed for A/D conversion according to the first embodiment and a time that may be needed for A/D conversion according to the second embodiment.

Next, a time that may be needed for A/D conversion according to the first embodiment and a time that may be needed for A/D conversion according to the second embodiment will be compared with each other with reference to FIGS. 12A and 12B.

FIGS. 12A and 12B are conceptual diagrams representing an example of the comparison between a time that may be needed for A/D conversion according to the first embodiment and a time that may be needed for A/D conversion according to the second embodiment.

FIG. 12A illustrates the time T(2) that may be needed for A/D conversion according to the second embodiment.

On the other hand, FIG. 12B illustrates the time T(1) that may be needed for A/D conversion according to the first embodiment.

Hereinafter, a count time for the P phase will be described as an example.

As illustrated in FIGS. 12A and 12B, time intervals ΔT(PLL(A)) that may be needed until the PLL circuit (A) is locked after the A/D conversion is started are almost the same.

In the first embodiment, as illustrated in FIG. 12B, after the PLL circuit (A) is in the locked state, the PLL circuit (B) is in the locked state, and then, counting is started.

In addition, it is assumed that a time interval that may be needed for counting by using the counter 1412a is ΔTa, and a time interval that may be needed for counting by using each of the counters 1412b and 1411c is ΔTb.

In the first embodiment, the counting of the upper bits by using the counter 1412c is performed by multiplying the frequency.

Accordingly, even when the time interval ΔT(PLL(B)) may be needed until the PLL circuit (B) is locked, the counting by using the counters 1412a to 1412c, as illustrated in FIG. 12B, is completed in a time interval that is equal to or shorter than a half of the counting time interval in the second embodiment.

For example, as illustrated in FIG. 12B, it is assumed that the counting by using the counters 1412a to 1412c is completed at time tα in the first embodiment.

At this time as illustrated in FIG. 12A, in the second embodiment, the counters 1412a and 1412c are in the process of counting, the time tα is even before time tβ when the bit of the MSB is inverted.

As described above, in the A/D conversion according to the first embodiment, counting for the upper 5 bits by using the counter 1412c is performed with the frequency multiplied by the PLL circuit (B).

Accordingly, the A/D conversion according to the first embodiment is performed at a higher speed than the A/D conversion according to the second embodiment.

3. Third Embodiment

The change ratio KVCO (see FIG. 6) of the VCOs 1411a and 1411b depends on the temperature, the power source voltage, or variations in the manufacturing process. In particular, when such a variation is generated in the VCO 1411a that generates the clock signal SCK corresponding to the voltage signal SVSL, the A/D conversion may not be performed accurately.

In a third embodiment, a column processing circuit that can correct the generated variation in the change ratio KVCO due to the temperature or the like will be described.

[Configuration Example of Column Processing Circuit 14b]

Figure 13:
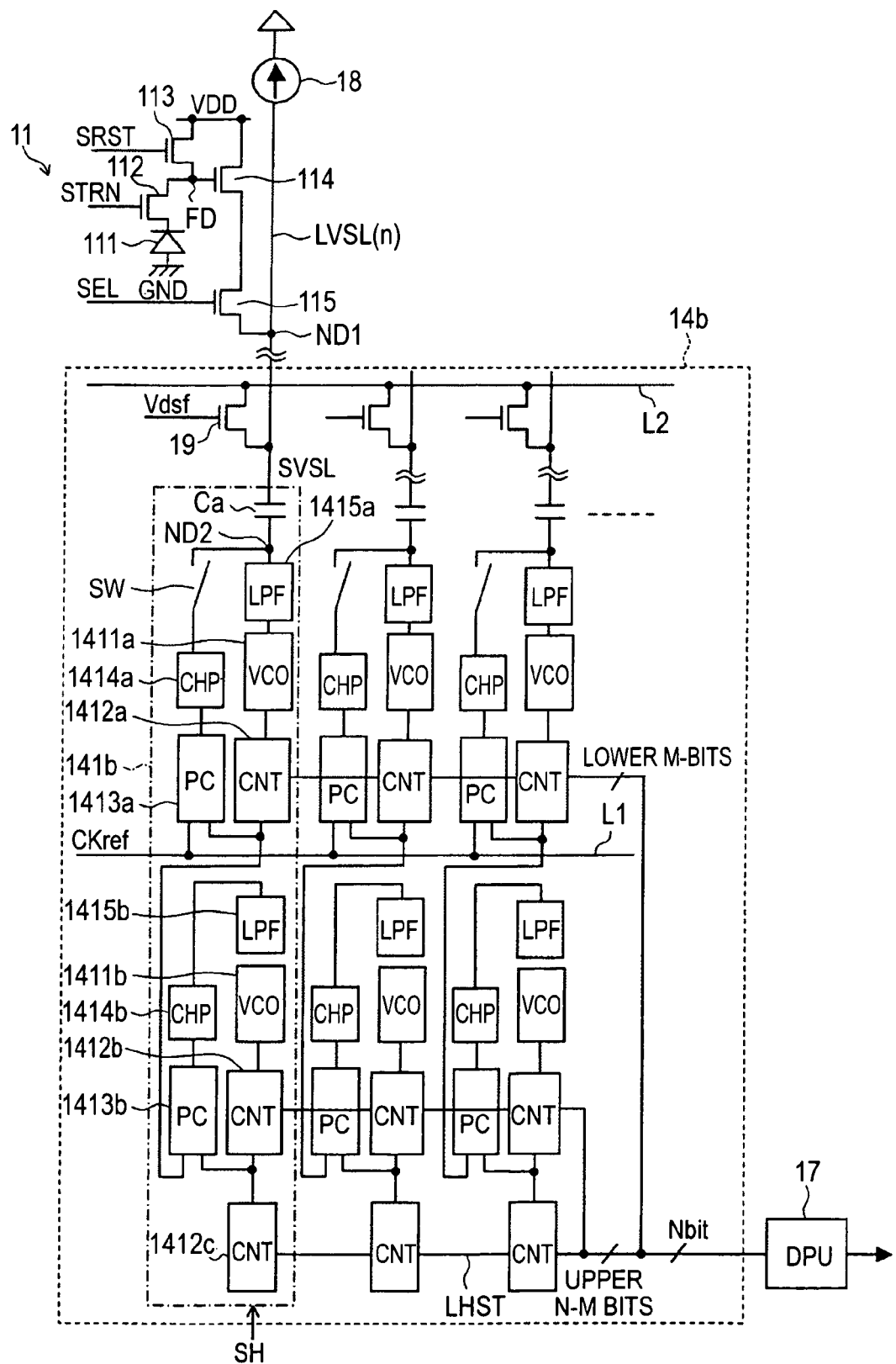
FIG. 13 is a schematic block diagram representing a configuration example of a column processing circuit according to a third embodiment of the present invention.

FIG. 13 is a schematic block diagram representing a configuration example of a column processing circuit according to the third embodiment of the present invention.

In FIG. 13, an m-th pixel circuit 11 that is connected to the vertical signal line LVSL(n) is shown, and the transmission signal line LTRN(m) and the like are appropriately omitted.

As shown in FIG. 13, the column processing circuit 14b has a transistor 19 for correcting the input voltage V of the VCO 1411a.

A first correction section according to an embodiment of the present invention is configured by the transistor 19 and the PLL circuit (A).

The drain of the transistor 19 is connected to the signal line L2. In addition, the source of the transistor 19 is connected between the node ND1 on the vertical signal line LVSL(n) and the capacitor Ca.

To the signal line L2, a voltage, for which the transistor 19 continues to be turned on when a gate voltage Vdsf is applied to the gate of the transistor 19, is applied.

The gate voltage Vdsf, for example, is a voltage V1 (a first voltage according to an embodiment of the present invention) of a black level or a voltage V2 (a second voltage according to an embodiment of the present invention) for which the counters 1412a to 1412c are in a maximum range during a counting period (time t3a to time t3b) for the D phase.

The voltages V1 and V2 can be appropriately set as long as the voltages V1 and V2 are different from each other. The black level is a voltage of the node ND1 when incident light is not incident to the pixel unit 10.

[Example of Operation of Column Processing Circuit 14b]

A theoretical value (a change ratio to be set according to an embodiment of the present invention) of the change ratio KVCO of the VCO 1411a is known in advance. The variation of a measured value from the theoretical value is calculated by measuring the change ratio KVCO at the time of the operation of the column processing circuit 14b and comparing the measured value with the theoretical value. Then, the measured change ratio KVCO is corrected to the theoretical value.

The change ratio KVCO to be measured can be calculated by using the following equations for calculation.

$$KVCO = (F1 - F2)/(V1 - V2) \quad \text{Equation (7)}$$

wherein $$F1 = \Delta CNT1/T1 \quad \text{Equation (8)}$$

$$F2 = \Delta CNT2/T2 \quad \text{Equation (9)}$$

In Equations (7) to (9), F1 (a first output frequency according to an embodiment of the present invention) is the output frequency of the VCO 1411a at a time when the gate voltage Vdsf for the P phase is a voltage V1. In addition, F2 (a second output frequency according to an embodiment of the present invention) is the output frequency of the VCO 1411a at a time when the gate voltage Vdsf for the D phase is a voltage V2.

$\Delta CNT1$ is a count value at a time when the gate voltage Vdsf for the P-phase is the voltage V1. $\Delta CNT2$ is a count value at a time when the gate voltage Vdsf for the D-phase is the voltage V2.

In addition, $\Delta T1$ is a count period (time t2b to time t2c) at a time when the gate voltage Vdsf for the P-phase is the voltage V1.

$\Delta T2$ is a count period (time t2b to time t2c) at a time when the gate voltage Vdsf for the D-phase is the voltage V2.

As represented in Equation (7), the change ratio KVCO is a ratio of a difference (F1−F2) of the two output frequencies to a difference (V1−V2) of the two gate voltages Vdsf. Hereinafter, a method of calculating the change ratio KVCO to be measured will be described with reference to FIGS. 14A to 14C.

FIGS. 14A to 14C are timing charts representing an example of the operation of the column processing circuit according to the third embodiment of the present invention.

FIG. 14A represents a horizontal period.

FIG. 14B represents an A/D conversion process of the ADC circuit 141b.

FIG. 14C represents the process of the DPU 17.

The pixel circuits 11 are sequentially driven in units of a row from the first row for reading out pixels. As represented in FIG. 14A, the oscillation frequencies F1 and F2 represented in Equation (7), that is, the count values $\Delta CNT1$ and $\Delta CNT2$ and the count periods $\Delta T1$ and $\Delta T2$ are calculated for a horizontal period 1HS.

The horizontal period 1HS is a period (time t1 to time t4: see FIGS. 8A to 8C) during which the pixel circuits 11 of the first row are driven so as to read out the pixels.

In particular, the voltage V1 is applied to the gate of the transistor 19 at time t2 for the P phase (see FIGS. 9A to 9J). At this time, the voltage of the vertical signal line LVSL(n) is corrected to the voltage V1.

Thereafter, the clamp switch SW is maintained in the ON state at time t2a for the P phase (see FIGS. 9A to 9J). At time t2c (see FIGS. 9A to 9J), when the oscillation frequency F of the VCO 1411a is fixed by the first correction section REVC1, the counters 1412a to 1412c start counting.

Accordingly, a sum Cp of the count values and the count period Tp (=t2f−t2e) for the P phase are acquired.

Thereafter, at time t3 for the D phase, the voltage V2 is applied to the gate of the transistor 19. At this time, the voltage VSL of the vertical signal line LVSL(n) is corrected to the voltage V2.

Thereafter, at time t3a to t3b, the counters 1412a to 1412c perform down-counting.

Accordingly, a sum Cd of the count values and the count period Td (=t3c-t3b) for the D phase are acquired.

The above-described process of the ADC circuit 141 for the horizontal period 1HS corresponds to a period of a "DSF signal" illustrated in FIG. 14B. In other words, the ADC circuit 141b performs A/D conversion for the voltage signal SVSL that is set to the voltage V1 and the voltage V2.

Then, the ADC circuit 141b outputs parameter values represented in Equation (7) to the DPU 17.

As illustrated in FIG. 14C, the DPU 17 (an acquisition unit, a detection unit, and a control unit according to an embodiment of the present invention) acquires parameter values from the ADC circuit 141b for a horizontal period 2HS. The horizontal period 2HS is a period in which the pixel circuits 11 disposed in the 2nd row are driven for reading out the pixels.

Thereafter, the DPU 17 calculates the change ratio KVCO by using Equation (7) based on the parameters. The DPU detects a variation of the measured value from a theoretical value by comparing the change ratio KVCO as the measured value with the change ratio KVCO as the theoretical value.

The DPU 17 generates correction data for correcting the variation to a corrected value. Then, the DPU 17 adjusts the gain by controlling the bias current of the VCO 1411a that configures the PLL circuit, so that the correction data can be reflected. In this embodiment, the DPU 17 corrects the input voltage V of the VCO 1411a by controlling the charge pump 1414a.

The measuring of the change ratio KVCO by using the ADC circuit 141 is performed only for the horizontal period 1HS. After the horizontal period 3HS, the clock signal SCK is generated based on the VCO 1411a of which the change ratio KVCO is corrected, and A/D conversion is performed for the clock signal SCK.

The DPU 17 processes the digital signal acquired by performing the A/D conversion by using the corrected VCOs 1411a and 1411b.

FIGS. 15A to 15D are timing charts illustrating an example of the operation of a column processing circuit according to the third embodiment of the present invention.

FIG. 15A represents a horizontal period.

FIG. 15B represents an A/D conversion process of the ADC circuit 141b.

FIG. 15C illustrates the process of the DPU 17.

FIG. 15D illustrates the operation of the charge pump 1414a.

The correction data that feeds back from the DPU 17 to the VCO 1411a is reflected as follows.

As illustrated in FIG. 15C, the DPU 17 controls the charge pump 1414a right before the horizontal period 3HS based on the correction data.

The DPU 17 raises the voltage of the charge pump 1414a, so that the change ratio KVCO becomes the theoretical value. Accordingly, the change ratio KVCO of the VCO 1411a is corrected to the theoretical value.

However, time lag of at least one horizontal period occurs until the correction is reflected based on the correction data.

Accordingly, as shown in FIG. 15C, for the horizontal period 3HS, no process is performed by the DPU 17.

In the above-described first to third embodiments, the DPU 17 can restore the original voltage signal from the count value by performing a process represented in the following equations.

$$Cp = CNT1p + CNT2p + T \times CNT3p = Fp \times Tp = KVCO \times Tp \times Vp \quad \text{Equation (10)}$$

wherein $$Vp = Cp/(KVCO \times Tp) \quad \text{Equation (11)}$$

$$Cd = Fd \times Td = KVCO \times Td \times Vd \quad \text{Equation (12)}$$

wherein $$Vd = Cd/(KVCO \times Td) \quad \text{Equation (13)}$$

In Equations (10) to (13), Fp is the output frequency of the VCO 1411a for the P phase. Fd is the output frequency of the VCO 1411a for the D phase.

Vp is the voltage value of the voltage signal SVSL for the P phase. Vd is the voltage value of the voltage signal SVSL for the D phase.

The original voltage signal Vsf is "Vp−Vd". Thus, the original voltage signal Vsf can be acquired by using the following equation.

$$Vsf = Vp - Vd = Cp/(KVCO \times Tp) - Cd/(KVCO \times Td) = (Cp - \alpha)/(KVCO \times Tp)$$

wherein $$Tp = \alpha \times Td \quad \text{Equation (15)}$$

According to the third embodiment, the A/D conversion can be performed at a high speed without depending on the capability of the VCO, and the layout area of the column processing circuit can be decreased. In addition, the advantages that are the same as those of the first and second embodiments can be acquired.

4. Fourth Embodiment

The CMOS image sensor having the above-described advantages can be applied to an imaging apparatus such as a digital camera or a video camera. Here, the CMOS image sensor 1 according to the first embodiment will be exemplified.

Figure 16:
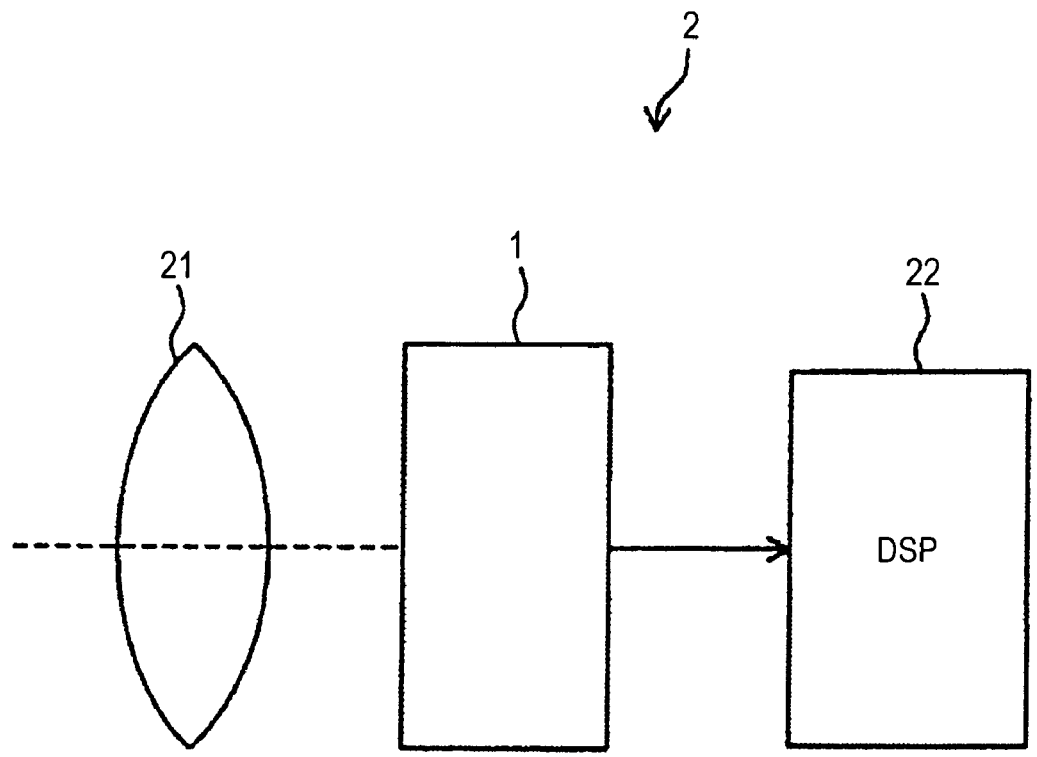
FIG. 16 is a diagram representing a configuration example of a camera according to a fourth embodiment of the present invention.

FIG. 16 is a diagram representing a configuration example of a camera according to a fourth embodiment of the present invention.

The camera 2, as represented in FIG. 16, has a CMOS image sensor 1 as an imaging device, an optical system that guides (images a subject image) incident light to a pixel area (pixel unit 10) of the CMOS image sensor 1, and a signal processing circuit (DSP) 22 that processes the output signal of the CMOS image sensor 1. The optical system, for example, is configured by a lens 21 that images incident light (image light) on an imaging surface.

The signal processing circuit 22 performs various image processes for the output signal of the CMOS image sensor 1. The image signal processed by the signal processing circuit 22 is recorded in a recording medium such as a memory. The image information recorded on the recording medium is hard-copied by a printer or the like. The image signal processed by the signal processing circuit 22 is output as a moving picture in a liquid crystal display or the like.

As described above, the CMOS image sensor 1 that can perform high-speed A/D conversion can be mounted on the camera 2.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a pixel unit that converts incident light into an electrical signal corresponding to the amount of the incident light; and a read-out unit that reads out a read-out signal from the pixel unit for a first period and a second period,
   wherein the read-out unit includes
   a clock signal generating section that generates clock signals having a frequency corresponding to the voltage of the read-out signal,
   a first counter section that counts the clock signals generated by the clock signal generating section,
   a second counter section that counts output clock signals of the first counter section,
   a first correction section that corrects the voltage of the read-out signal to be constant before start of counting of the first and second counter sections for the first period and stops correction of the voltage of the read-out signal after the start of counting of the first and second counting sections for the first period and during the second period, and
   a second correction section that corrects a frequency of the output clock signals of the first counter section to a frequency that is higher than the frequency of the output clock signals,
   wherein the clock signals are counted by a base $2^M$ counter, and the output clock signals are counted by a base $2^{(N-M)}/2$ counter, M denoting the number of bits considered to be on the least significant bit side of the read-out signal, and N−M denoting the number of bits considered to be on the most significant bit side of the read-out signal.

2. The imaging device according to claim 1, wherein the first correction section can form a phase locked loop, which includes at least a voltage-controlled oscillator that can oscillate at a frequency corresponding to the voltage of the read-out signal, for a reference signal and, for a correction period during which the voltage of the read-out signal is corrected to be constant, forms the phase locked loop and oscillates the voltage-controlled oscillator by using a voltage on the basis of the phase locked loop as a correction voltage.

3. The imaging device according to claim 1, wherein the second correction section forms a second phase locked loop including at least a second voltage-controlled oscillator that can oscillate at a frequency corresponding to the voltage of the output clock signal, so that the frequency of the output clock signal can be multiplied with the output clock signal of the first counter section used as a reference signal.

4. The imaging device according to claim 1, further comprising a calculation unit that multiplies a count value of the second counter section by a multiplying factor by which the frequency of the output clock signal of the first counter is multiplied.

5. The imaging device according to claim 1, further comprising a direction unit that outputs a direction signal for directing a correction period during which the first correction section corrects the voltage of the read-out signal to be constant.

6. The imaging device according to claim 5, wherein the direction unit outputs a count start signal for directing the first and the second counter sections to start counting after correction of the voltage of the read-out signal is completed by the first correction section and correction of the output clock signal is completed by the second correction section.

7. The imaging device according to claim 1, further comprising:
an acquisition unit that acquires a change ratio of an output frequency of the clock signal generating section to an input voltage of the clock signal generating section;
a detection unit that detects an error between the change ratio acquired by the acquisition unit and a change ratio to be set; and
a control unit that controls the amount of a current of the clock signal generating section that forms the phase locked loop of the first correction section, so that the change ratio acquired by the acquisition unit coincides with the change ratio to be set, in a case where the detection unit detects the error.

8. The imaging device according to claim 7,
wherein the first correction section sets the input voltage of the clock signal generating section to a first voltage for the correction period of the first period and sets the input voltage of the clock signal generating section to a second voltage that is different from the first voltage for the second period, and
wherein the acquisition unit acquires the change ratio based on an output frequency difference between a first output frequency of the clock signal generating section for the first period and a second output frequency of the clock signal generating section for the second period and a voltage difference between the first voltage and the second voltage.

9. A method of converting a read-out signal, the method comprising the steps of:
reading out a read-out signal from a pixel unit for a first period;
correcting the voltage of the read-out signal, which is read out in the reading out of a signal, for the first period to be constant;
stopping the correcting of the voltage of the read-out signal;
generating a clock signal having a frequency corresponding to the voltage of the read-out signal that is corrected in the stopping of the correcting of the voltage;
counting the clock signals that are generated in the generating of a clock signal;
correcting the frequency of the output clock signal, which is output in the counting of the clock signals, to a frequency that is higher than the frequency of the output clock signal;
counting the output clock signals that are corrected in the correcting of the frequency of the output clock signal;
reading out a read-out signal from the pixel unit for the second period;
generating a clock signal having a frequency corresponding to the voltage of the read-out signal that is read out in the reading out of a signal for the second period;
counting the clock signals generated in the generating of the clock signal;
correcting the frequency of the output clock signal, which is output in the counting of the clock signals, to a frequency higher than the frequency of the output clock signal; and
counting the output clock signals that are corrected in the correcting of the frequency of the output clock signal,
wherein the clock signals are counted by a base $2^M$ counter, and the output clock signals are counted by a base $2^{(N-M)}/2$ counter, M denoting the number of bits considered to be on the least significant bit side of the read-out signal, and N−M denoting the number of bits considered to be on the most significant bit side of the read-out signal.

10. A camera comprising:
an imaging device;
an optical system that guides light incident to a pixel area of the imaging device; and
a signal processing unit that processes an output signal output by the imaging device,
wherein the imaging device includes
a pixel unit that converts incident light into an electrical signal corresponding to the amount of the incident light, and
a read-out unit that reads out a read-out signal from the pixel unit for a first period and a second period,
wherein the read-out unit includes
a clock signal generating section that generates clock signals having a frequency corresponding to the voltage of the read-out signal,
a first counter section that counts the clock signals generated by the clock signal generating section,
a second counter section that counts output clock signals of the first counter section,
a first correction section that corrects the voltage of the read-out signal to be constant before start of counting of the first and second counter sections for the first period and stops correction of the voltage of the read-out signal after the start of counting of the first and second counting sections for the first period and during the second period, and
a second correction section that corrects a frequency of the output clock signals of the first counter section to a frequency that is higher than the frequency of the output clock signals,
wherein the clock signals are counted by a base $2^M$ counter, and the output clock signals are counted by a base $2^{(N-M)}/2$ counter, M denoting the number of bits considered to be on the least significant bit side of the read-out signal, and N−M denoting the number of bits considered to be on the most significant bit side of the read-out signal.

* * * * *